(12) United States Patent
Iyer et al.

(10) Patent No.: US 10,613,488 B2
(45) Date of Patent: Apr. 7, 2020

(54) SYSTEM AND METHOD FOR GENERATING A SCHEDULE TO EXTRACT A RESOURCE FLUID FROM A RESERVOIR

(71) Applicant: General Electric Company, Schenectady, NY (US)

(72) Inventors: Naresh Sundaram Iyer, Schenectady, NY (US); Steven Hector Azzaro, Oklahoma City, OK (US); Glen Richard Murrell, Oklahoma City, OK (US); Robert Carl Lloyd Klenner, Oklahoma City, OK (US); Panqing Gao, Oklahoma City, OK (US)

(73) Assignee: General Electric Co., Schenectady, NY (US)

( * ) Notice: Subject to any disclaimer, the term of this patent is extended or adjusted under 35 U.S.C. 154(b) by 170 days.

(21) Appl. No.: 15/334,656

(22) Filed: Oct. 26, 2016

(65) Prior Publication Data

US 2017/0242410 A1 Aug. 24, 2017

Related U.S. Application Data

(60) Provisional application No. 62/296,943, filed on Feb. 18, 2016.

(51) Int. Cl.
*G05B 13/04* (2006.01)
*G06Q 10/06* (2012.01)
(Continued)

(52) U.S. Cl.
CPC ........ *G05B 13/041* (2013.01); *E21B 41/0092* (2013.01); *E21B 49/00* (2013.01);
(Continued)

(58) Field of Classification Search
CPC .... G05B 13/041; E21B 41/0092; E21B 49/00
See application file for complete search history.

(56) References Cited

U.S. PATENT DOCUMENTS 8,855,986 B2 10/2014 Castellini et al.
2002/0007947 A1 * 1/2002 Patel ................. E21B 43/24
166/252.1

(Continued)

FOREIGN PATENT DOCUMENTS

WO 01/62603 A2 8/2001
WO WO-2007084348 A1 * 7/2007 ............. E21B 43/00
(Continued)

OTHER PUBLICATIONS

Klenner, R., et al., "Optimization of Production and CO2 Utilization via Parametric Representation and Evaluation of WAG Schedules," Society of Petroleum Engineers, pp. 1-13 (Apr. 11-13, 2016).
(Continued)

*Primary Examiner* — Laura M Menz
(74) *Attorney, Agent, or Firm* — Laura L. Pollander

(57) ABSTRACT

System includes one or more processors that are configured to perform iterations of the following until a predetermined condition is satisfied. The one or more processors are configured to select a modified trial schedule. The modified trial schedule is selected based on initial fluid-extraction data and initial trial schedules and, if available, prior modified trial schedules and prior modified fluid-extraction data from prior iterations. The one or more processors are configured to receive modified fluid-extraction data generated by execution of the modified trial schedule with a designated model of the reservoir. The one or more processors are also configured to update the surrogate model with the modified fluid-extraction data and the modified trial schedule. For at least a plurality of the iterations, the modified trial schedule
(Continued)

is selected, at least in part, to reduce uncertainty in a sample space as characterized by the surrogate model.

20 Claims, 14 Drawing Sheets

(51) Int. Cl.
    *E21B 41/00*      (2006.01)
    *E21B 49/00*      (2006.01)
    *G05B 13/02*      (2006.01)
    *E21B 43/16*      (2006.01)
    *E21B 43/24*      (2006.01)
    *E21B 43/26*      (2006.01)

(52) U.S. Cl.
    CPC ......... *G05B 13/0265* (2013.01); *G06Q 10/06* (2013.01); *E21B 43/164* (2013.01); *E21B 43/166* (2013.01); *E21B 43/24* (2013.01); *E21B 43/26* (2013.01)

(56) References Cited

U.S. PATENT DOCUMENTS

| | | | |
|---|---|---|---|
| 2003/0110017 A1* | 6/2003 | Guthrie | G06F 17/18 703/2 |
| 2016/0069169 A1 | 3/2016 | Iyer et al. | |
| 2017/0242410 A1* | 8/2017 | Iyer | E21B 41/0092 |

FOREIGN PATENT DOCUMENTS

| | | | | |
|---|---|---|---|---|
| WO | WO-2008144413 A1 * | 11/2008 | | E21B 43/24 |
| WO | WO-2014003763 A1 * | 1/2014 | | E21B 43/00 |
| WO | WO-2016108807 A1 * | 7/2016 | | E21B 43/267 |
| WO | WO-2017143326 A1 * | 8/2017 | | E21B 41/0092 |

OTHER PUBLICATIONS

International Search Report and Written Opinion issued in connection with corresponding PCT Application No. PCT/US17/18608 dated Apr. 10, 2017.

Iyer, N.S., et al., A system and method for parametric representation and evaluation of wag schemes to enable field-specific recovery optimization, GE co-pending U.S. Appl. No. 62/047,709, filed Sep. 9, 2014.

* cited by examiner

SYSTEM AND METHOD FOR GENERATING A SCHEDULE TO EXTRACT A RESOURCE FLUID FROM A RESERVOIR

CROSS-REFERENCE TO RELATED APPLICATIONS

The present application claims the benefit of U.S. Provisional Application No. 62/296,943, filed on Feb. 18, 2016, which is incorporated herein by reference in its entirety.

The present application describes subject matter that is similar to subject matter disclosed in U.S. application Ser. No. 14/808,636 and U.S. Provisional Application No. 62/047,709, each of which is incorporated herein by reference in its entirety.

FIELD

Embodiments of the subject matter described herein relate to systems and methods that extract resources from subterranean reservoirs.

BACKGROUND

Resources from a subterranean reservoir (e.g., oil) may be removed from the reservoir by injecting a working fluid into the reservoir. For example, carbon dioxide-based tertiary oil recovery has become a popular recovery process. This type of recovery involves injecting carbon dioxide ($CO_2$) into a subterranean reservoir to recover oil from the reservoir. Significant volumes of $CO_2$ can be used to extract the oil. Given the volumes of the $CO_2$ that are required to be injected into the reservoir, this type of recovery often occurs in an environment where $CO_2$ is a highly constrained and a supply-limited commodity. This can require operators to make the best possible use of the instantaneous $CO_2$ that is available in the market.

Effective use of $CO_2$ for enhanced tertiary oil recovery ($CO_2$EOR) involves various alternative methods, such as the water-alternating-gas (WAG) method. The WAG method involves periodically alternating the injection of $CO_2$ and water into the reservoir according to a schedule with the intent of sweeping the leftover oil out of the reservoir. Effective use of WAG requires meeting multiple constraints while seeking to increase the rate of oil extraction. Inappropriately designed WAG schedules can result in poor production and early breakthrough of water and/or gas, thereby making the recovery of oil viable only for short periods of time. Presently, WAG schedules are based on knowledge of the reservoir and prior experience with other reservoirs and require a significant amount of time to develop.

BRIEF DESCRIPTION

In an embodiment, a system is provided that includes a control system including one or more processors that are configured to obtain resource extraction parameters for extracting a resource fluid from a reservoir by providing a working fluid into the reservoir. The one or more processors are also configured to select a set of initial trial schedules. The initial trial schedules have different values of the resource extraction parameters for providing the working fluid into the reservoir. The initial trial schedules are distributed with respect to one another in a sample space. The one or more processors are also configured to receive initial fluid-extraction data. The initial fluid-extraction data is generated by execution of the initial trial schedules with a designated model of the reservoir (which may also be referred to as a "reservoir model"). The one or more processors are also configured to generate a surrogate model based on the initial fluid-extraction data and the initial trial schedules. The one or more processors are also configured to perform iterations of the following until a predetermined condition is satisfied. The one or more processors are also configured to select a modified trial schedule and receive modified fluid-extraction data. The modified fluid-extraction data is generated by execution of the modified trial schedule with the designated model of the reservoir. The modified trial schedule is selected based on the initial fluid-extraction data and the initial trial schedules and, if available, prior modified trial schedules and prior modified fluid-extraction data from prior iterations. The one or more processors are also configured to generate an updated surrogate model that is based on the initial fluid-extraction data, the initial trial schedules, the modified fluid-extraction data, and the modified trial schedule, and, if available, the prior modified trial schedules and the prior modified fluid-extraction data from the prior iterations. For at least a plurality of the iterations, the modified trial schedule is selected, at least in part, to reduce uncertainty in the sample space as characterized by the surrogate model.

In some aspects, the modified trial schedules are selected to reduce uncertainty in the sample space by using active learning techniques from machine learning.

In some aspects, the modified trial schedules are selected to reduce uncertainty in the sample space by using Bayesian optimization of Gaussian Process Regression surrogates.

In some aspects, the modified trial schedules are selected to improve one or more metrics-of-interest in extracting the resource fluid from the reservoir.

In some aspects, the modified trial schedules are selected to increase a net present value of extracting the resource liquid from the reservoir.

In some aspects, the resource extraction parameters characterize how the working fluid is provided into the reservoir while extracting the resource liquid.

In some aspects, the predetermined condition is satisfied when at least one of: (a) a predetermined time elapses; (b) a metric-of-interest obtained by one of the trial schedules passes a threshold value; (c) respective values of a metric-of-interest that are obtained by the two trial schedules that were last executed are substantially equal; (d) a plurality of metrics-of-interest by one of the trial schedules exceed a designated value of a designated multi-variable function; or (e) a total number of trial schedules have been executed or a total number of iterations have been executed.

In some aspects, at least one of the resource extraction parameters is based on a geological constraint of the reservoir. For example, the resource extraction parameters may be determined, at least in part, by geological constraints (e.g., size, shape, etc.) of the reservoir.

In an embodiment, a method is provided that includes obtaining resource extraction parameters for extracting a resource fluid from a reservoir by providing a working fluid into the reservoir. The method also includes selecting a set of initial trial schedules. The initial trial schedules have different values of the resource extraction parameters for providing the working fluid into the reservoir. The initial trial schedules are distributed with respect to one another in a sample space. The method also includes receiving initial fluid-extraction data. The initial fluid-extraction data is generated by execution of the initial trial schedules with a designated model of the reservoir. The method also includes generating a surrogate model based on the initial fluid-extraction data and the initial trial schedules. The method also includes performing a plurality of iterations of the following until a predetermined condition is satisfied. Each iteration includes selecting a modified trial schedule and receiving modified fluid-extraction data. The modified fluid-extraction data is generated by execution of the modified trial schedule using the designated model of the reservoir. The modified trial schedule is selected based on the initial fluid-extraction data and the initial trial schedules and, if available, prior modified trial schedules and prior modified fluid-extraction data from prior iterations. Each iteration also includes generating an updated surrogate model that is based on the initial fluid-extraction data, the initial trial schedules, the modified trial schedule, and the modified fluid-extraction data, and, if available, the prior modified fluid-extraction data and the prior modified trial schedules from the prior iterations. For at least a plurality of the iterations, the modified trial schedule is selected, at least in part, to reduce uncertainty in the sample space as characterized by the surrogate model.

In some aspects, the method also includes extracting the resource fluid from the reservoir based on the last trial schedule that was executed when the predetermined condition was met or the trial schedule that was executed immediately before the last trial schedule.

In some aspects, the step of extracting the resource fluid from the reservoir includes using one of: (a) a water-alternating-gas process; (b) a fracking process; or (c) a steam process.

In an embodiment, a tangible and non-transitory computer readable medium is provided that includes one or more programmed instructions configured to direct one or more processors to obtain resource extraction parameters for extracting the resource fluid from a reservoir by providing a working fluid into the reservoir. The one or more processors are also directed to select a set of initial trial schedules. The initial trial schedules have different values of the resource extraction parameters for providing the working fluid into the reservoir. The initial trial schedules are distributed with respect to one another in a sample space. The one or more processors are also directed to receive initial fluid-extraction data. The initial fluid-extraction data is generated by execution of the initial trial schedules with a designated model of the reservoir. The one or more processors are also directed to generate a surrogate model based on the initial fluid-extraction data and the initial trial schedules. The programmed instructions are configured to direct the one or more processors to perform a plurality of iterations of the following until a predetermined condition is satisfied. Each iteration includes selecting a modified trial schedule and receiving modified fluid-extraction data. The modified fluid-extraction data is generated by execution of the modified trial schedule with the designated model of the reservoir. The modified trial schedule is selected based on the initial fluid-extraction data and the initial trial schedules and, if available, prior modified trial schedules and prior modified fluid-extraction data from prior iterations. Each iteration also includes generating an updated surrogate model that is based on the initial fluid-extraction data, the initial trial schedules, the modified-fluid-extraction data, and the modified trial schedule, and, if available, the prior modified trial schedules and the prior modified fluid-extraction data from the prior iterations. For at least a plurality of the iterations, the modified trial schedule is selected, at least in part, to reduce uncertainty in the sample space as characterized by the surrogate model.

In an embodiment, a system is provided that includes one or more processors that are configured to select a set of initial trial schedules. The initial trial schedules having different values of resource extraction parameters for extracting a resource fluid by providing working fluid into a reservoir. The initial trial schedules are distributed with respect to one another in a sample space. The one or more processors are also configured to receive initial fluid-extraction data. The initial fluid-extraction data is generated by execution of the initial trial schedules with a designated model of the reservoir. The one or more processors are also configured to generate a surrogate model based on the initial fluid-extraction data and the initial trial schedules. The one or more processors are also configured to perform iterations of the following until a predetermined condition is satisfied. Each iteration includes selecting a modified trial schedule based on the initial fluid-extraction data and the initial trial schedules and, if available, prior modified trial schedules and prior modified fluid-extraction data from prior iterations. Each iteration is also configured to receive modified fluid-extraction data. The modified fluid-extraction data is generated by execution of the modified trial schedule with the designated model of the reservoir. Each iteration also includes updating the surrogate model based on the modified fluid-extraction data and the modified trial schedule. For at least a plurality of the iterations, the modified trial schedule is selected, at least in part, to reduce uncertainty in the sample space as characterized by the surrogate model.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
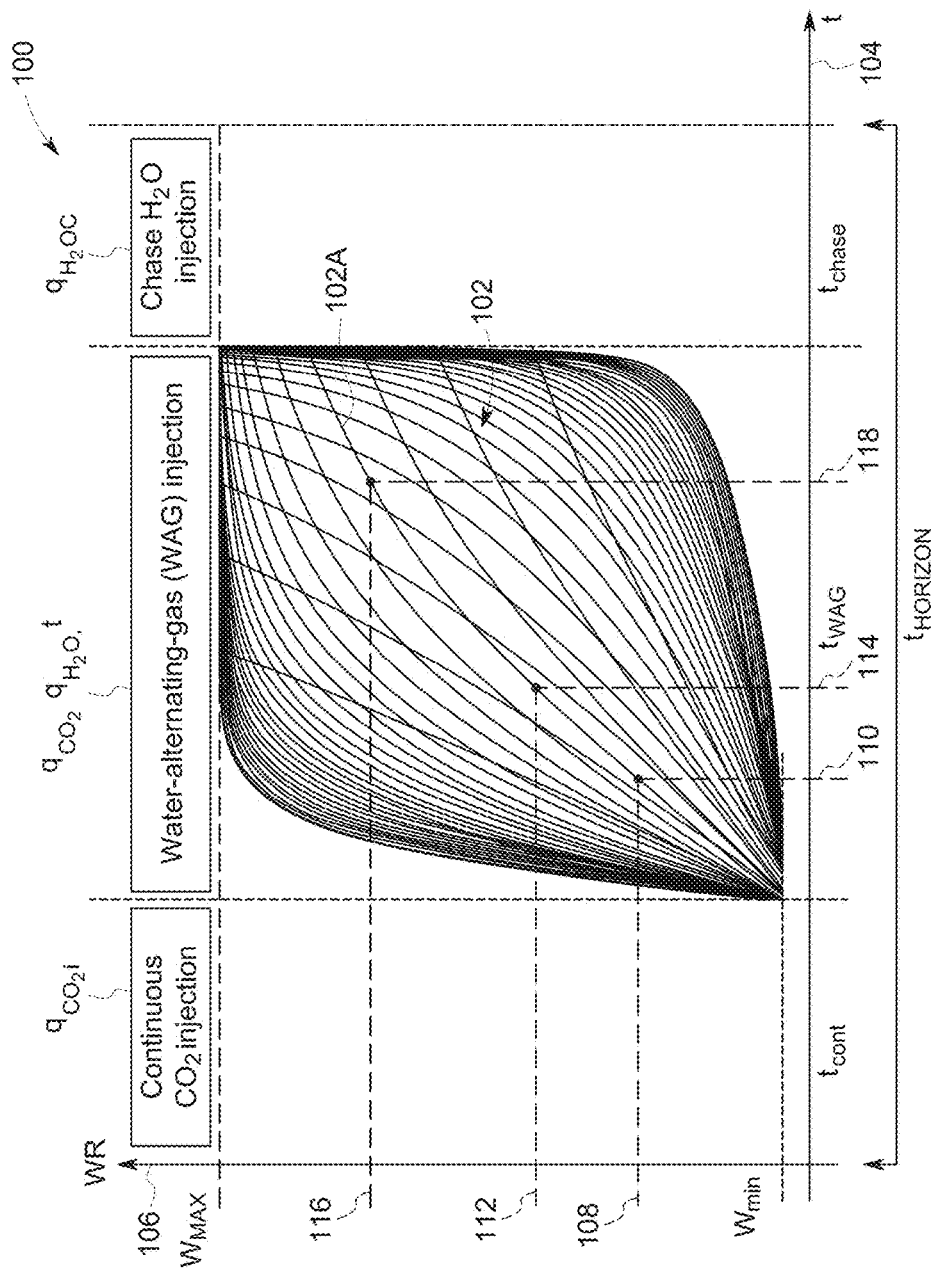
FIG. 1 illustrates a group of fluid-and-gas ratio functions according to one example.

One or more embodiments described herein may provide systems and methods for generating a work schedule that specifies the parameters for extracting a resource fluid (e.g., oil) from a reservoir. In addition, one or more embodiments described herein provide systems and methods for designing and/or implementing the work schedules, which may be referred to as fluid-and-gas ratio functions in some embodiments, that are customized to subterranean liquid resource reservoirs in order to increase the amount of liquid resources (e.g., oil) that are extracted from the reservoirs, while operating within constraints such as an amount of gas (e.g., $CO_2$) that is available. The schedules or ratio functions may be determined and implemented, and the outputs of the schedules or ratio functions examined in order to further refine or modify the schedules or ratio functions. In the following description, the terms "work schedule" and "ratio functions" may be used interchangeably.

Although embodiments set forth herein are described with specific reference to a water-alternating-gas (WAG) process, embodiments may also be applicable to a fracking process or a steam process.

Resource extraction parameters characterize how the working fluid is provided into the reservoir while extracting the resource liquid. Some resource extraction parameters used to control the extraction of the resources are the rates or amounts of a fluid (e.g., water) and a gas (e.g., $CO_2$) being injected into the reservoir, the time at which the injectant (e.g., the fluid and the gas) being injected into the reservoir changes to the other injectant, and times at which to change the rates or amounts of the injectants and/or the times at which the injectants are switched. In one aspect of the subject matter described herein, the amounts of the fluid and gas and/or the rates at which the fluid and gas are separately injected into the reservoir are defined by a ratio of the fluid amount or rate to the gas amount or rate. The ratio may change with respect to time. For example, a fluid-and-gas or WAG ratio function can designate different fluid-to-gas ratios for different times. As time progresses, the ratio of fluid-to-gas that is injected into the reservoir changes.

The ratio function may increase the ratio of fluid to gas volumes that are injected into the reservoir over time, while the volume of gas that is injected into the reservoir remains constant (or decreases). Alternatively, the ratios may change in another manner. The ratio function may represent non-decreasing curves to reflect the increasing volumes of fluid being injected into the reservoir relative to the constant or decreasing volumes of gas being injected into the reservoir over time. The non-decreasing curves can be sigmoid functions or curves, an inverse exponential curve, or another type of decreasing curve.

In operation, the fluid and gas are alternatively injected into the reservoir at different times in amounts (or at rates) designated by the ratio function for the reservoir. As time passes, the ratio function dictates that different ratios be used. Periodically, continually, or randomly, the ratio function may be checked to determine if a different ratio be used. If so, the different ratio is used to change the injected volumes (or rates of injection) of the fluid and gas into the reservoir. This process may be repeated to repeatedly modify the ratio.

In one aspect, a family (e.g., group) of different ratio functions may be determined for the same reservoir. The ratio function being used to determine the ratio of fluid-to-gas being injected into the reservoir may be changed to a different ratio function. This change may occur in response to a supply of one or more of the injectants, such as the gas, changing (e.g., decreasing) and/or in response to the output of the resource being extracted from the reservoir decreasing below an expected or designated amount (e.g., a threshold associated with the ratio function, such as a cumulative amount of the resource that is expected to be extracted from the reservoir by using the ratio function up to a current time).

Some systems and methods described herein may create a customized fluid-and-gas ratio function (or groups of ratio functions) for a reservoir. The customized ratio function (or work schedule) may be based on (e.g., a function of) a variety of parameters, such as user-input constraints (e.g., limits on the amounts or rates of injecting fluids or gases), a type of ratio function, a limitation on a rate of change in the ratios designated by the first fluid-and-gas ratio function, a periodicity limitation on changes to the ratios designated by the first fluid-and-gas ratio function, a cycle time for alternating between injecting the fluid and injecting the gas into the reservoir, an update frequency at which the ratio designated by the fluid-and-gas ratio function is updated, an availability of the fluid, an availability of the gas, a cumulative amount of the liquid resource to be extracted from the reservoir, a designated time period in which to extract the cumulative amount of the liquid resource, a cumulative amount of the gas that is to be injected into the reservoir, a net value of the liquid resource that is to be extracted from the reservoir, and/or an available amount of the gas that is available for injection into the reservoir.

The ratio function or functions can be communicated to a central controller at the pumping location (e.g., the location where the fluid and gas are pumped into the reservoir by respective pumps). The central controller can repeatedly check the ratio function and direct pump controllers to control the injection of the fluid and gas into the reservoir according to the ratio currently designated by the ratio function. As the ratio function designates different ratios at different times, the controller can direct the pumps to correspondingly change the rates of injection or injected amounts of the fluid and the gas.

The ratio function being used can be checked by examining the amount or rate at which the resource is being extracted from the reservoir. If less than a desired or designated amount of the resource is being obtained using the ratio function, then the ratio function may be examined and potentially modified or replaced. The modification or replacement of the ratio function may be performed to try and find an "optimal" ratio function for the reservoir. An "optimal" ratio function may be a function that causes a larger amount of the resource to be obtained from the reservoir or a larger amount of the resource per unit of the gas being injected to be obtained from the reservoir relative to one or more other ratio functions, or relative to all other ratio functions.

The systems and methods described herein can help with increasing outcomes such as oil production, $CO_2$ net utilization, $CO_2$ storage, and field economic value, among others. In the absence of such a system or method, field operators use approximate schemes to determine the amounts of fluid and gas to inject based on intuition and observations alone, which are not guaranteed to identify optimal or better schemes. Thus, the systems and methods described herein can help oilfield operators to get more out of the $CO_2$ recovery process and infrastructure. Currently, the industry using $CO_2$ to extract oil purchases about 60 million tons of $CO_2$ and extracts about 110 million barrels of oil annually. This translates to a $CO_2$ net utilization rate of 10 Mcf/barrel across the industry.

Using one or more embodiments of the systems and methods described herein can increase the net utilization rate of $CO_2$ by at least 5% and thereby impact approximately $110 to 438 million dollars via reduced $CO_2$ purchases and/or increased oil production. The added flexibility of being able to use the systems and methods on a field-specific basis further allows customized field-specific strategies of $CO_2$ usage. Additionally, the systems and methods allow for oilfield operators to monitor and track the oil recovery and injection parameters and, in the presence of deviations from the recommended strategies of the ratio functions (e.g., due to limited presence of $CO_2$ or other causes), the systems and methods can be used to re-configure and/or update the ratio functions during extraction of the oil.

Figure 2A:
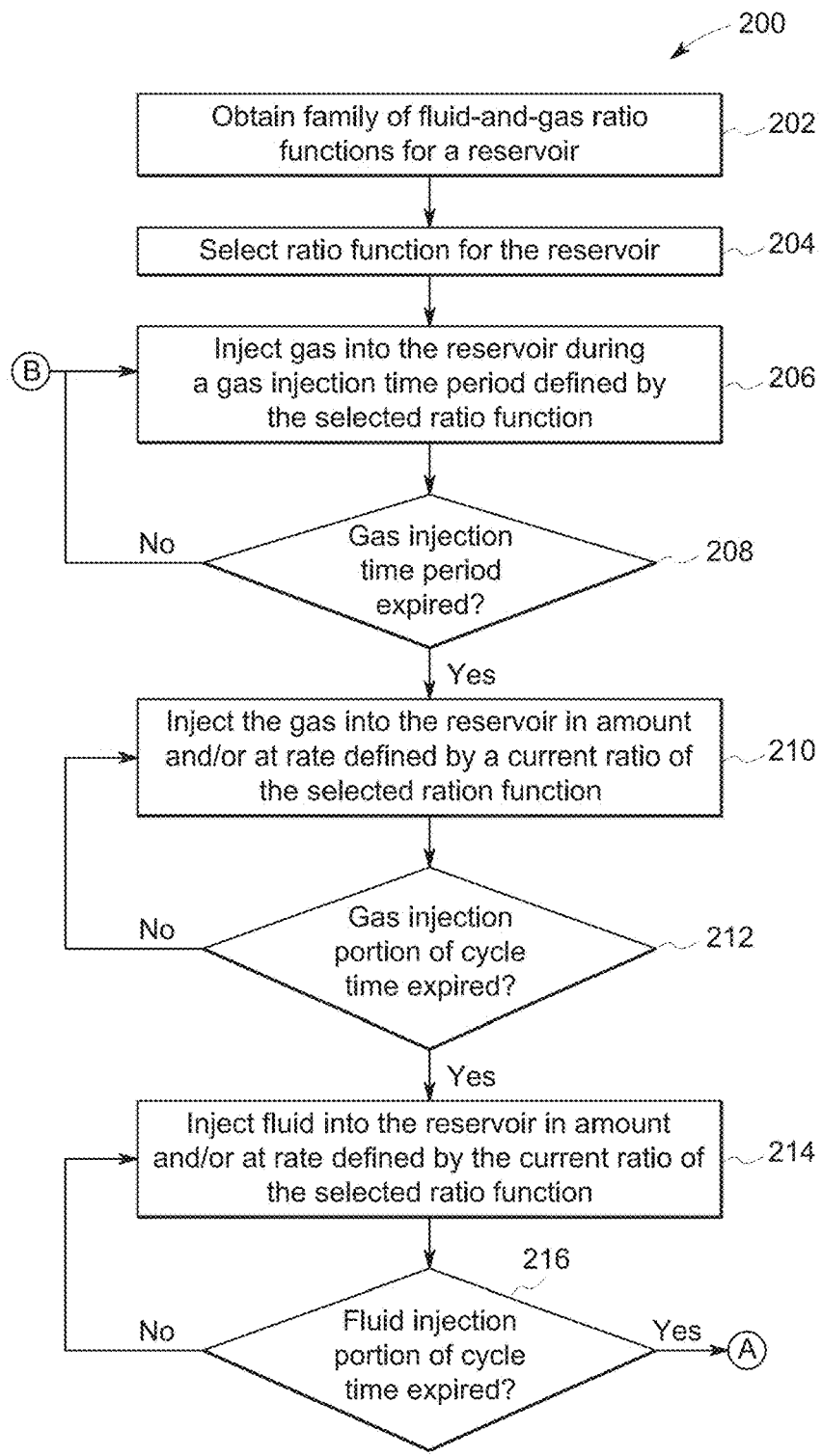
FIG. 2A illustrates a first portion of a flowchart of one embodiment of a method for extracting a resource from a reservoir.
Figure 2B:
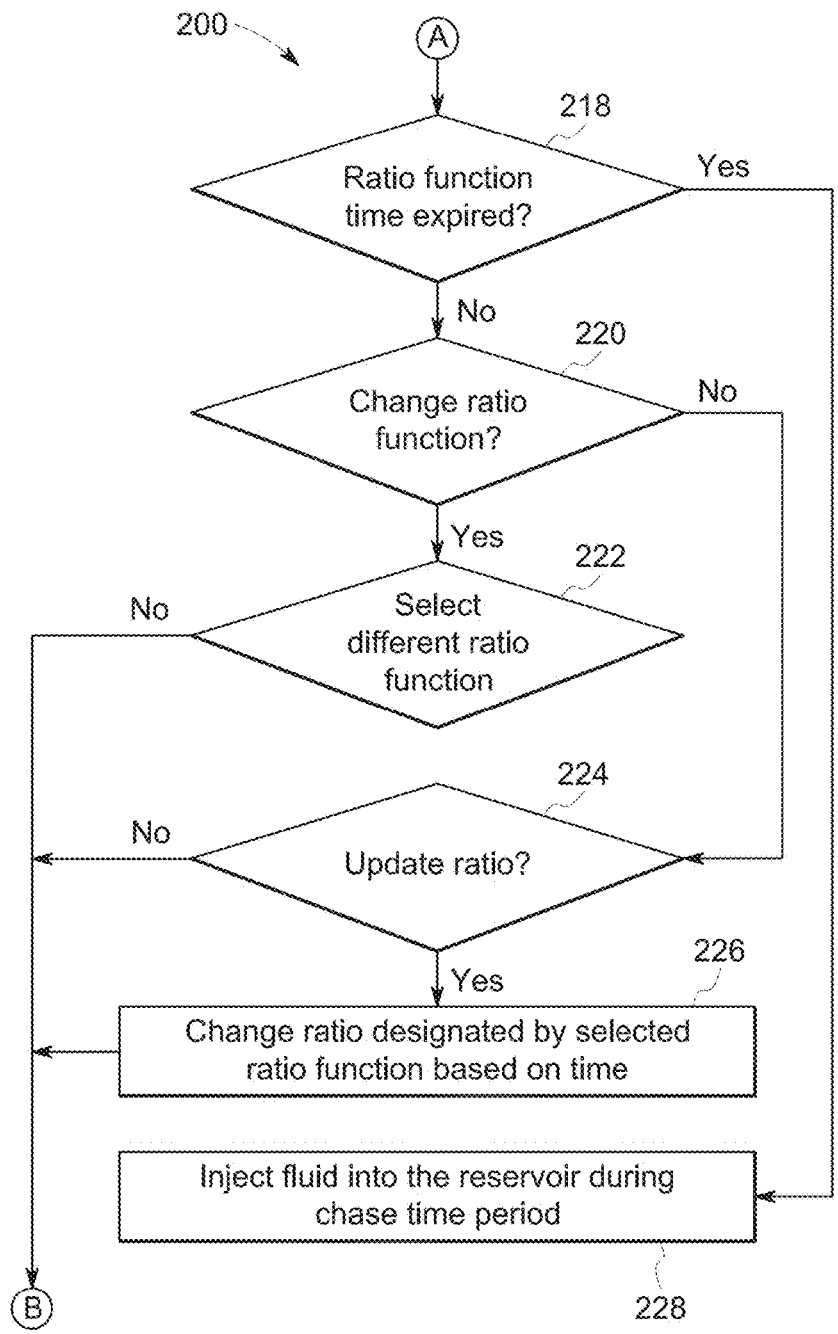
FIG. 2B illustrates a second portion of a flowchart of one embodiment of a method for extracting a resource from a reservoir.

FIG. 1 illustrates a group 100 of fluid-and-gas ratio functions (or work schedules) 102 according to one example. FIGS. 2A and 2B illustrate a flowchart of one embodiment of a method 200 for extracting a resource from a reservoir. The method 200 may be used to obtain a resource, such as oil, from a subterranean oil field (e.g., a reservoir). The method 200 may represent an algorithm and/or be used to generate a software program that controls computerized systems to pump fluid (e.g., water) and gas (e.g., $CO_2$ or another gas) into the reservoir.

At 202, a family (e.g., the group 100) of fluid-and-gas ratio functions is obtained. In FIG. 1, the family of ratio functions 102 is shown alongside a horizontal axis 104 representative of time (represented as t in FIG. 1) and a vertical axis 106 representative of a ratio of an amount of fluid injected into a reservoir to an amount of gas injected into the reservoir (where the ratio is represented as WR in FIG. 1). The ratio functions 102 can be obtained from a memory, such as the memory 310 shown in FIG. 3.

Different ratio functions 102 may be defined for different reservoirs based on resource extraction parameters. Optionally, the group 100 of the ratio functions 102 may be defined for the same reservoir. As shown in FIG. 1, the ratio functions 102 are non-decreasing curves. The ratios designated by the different ratio functions 102 do not decrease with increasing time. Alternatively, the ratio functions 102 may include one or more decreasing portions or curves.

The ratio functions 102 designate different ratios at different times. The ratios may be used to determine how much of a fluid (e.g., water) to inject into the reservoir during a cycle time (where half of a cycle time is represented in FIG. 1 as $t_h$) and how much of a gas (e.g., $CO_2$) to inject into the reservoir during the same cycle time. During a single cycle (e.g., a single cycle time), the fluid may be injected into the reservoir during a first half of the cycle time and the gas may be injected into the reservoir during a second half of the cycle time. The fluid may not be injected while the gas is being injected, and the gas may not be injected while the fluid is being injected. Alternatively, both the fluid and gas may be injected concurrently for at least part of the cycle time.

As shown in FIG. 1, the ratio functions 102 represent ratios that continually change with respect to time. For example, each of the ratio functions 102 may not include the exact same ratio at two or more different times because the ratios continually change within the ratio function 102. The continually changing ratios are represented by the smooth curve shapes of the ratio functions 102. Alternatively, one or more of the ratio functions 102 may not represent ratios that continually change with respect to time. For example, one or more of the ratio functions 102 may include the exact same ratio at two or more different times. Such a function 102 may include one or more horizontally flat portions representative of the same ratios at different times.

At 204, a ratio function 102 is selected from the family of ratio functions 102. One of the ratio functions 102 may be selected for the reservoir, such as by a user or operator of the systems described herein. Optionally, a single ratio function 102 may be created and used for the reservoir, a ratio function 102 may be automatically selected (e.g., one of the ratio functions 102 may be a default function), etc. The gas is injected into the reservoir at a gas injection rate (represented as qco2 in FIG. 1). The selected ratio function 102 is used to determine the amounts of gas and fluid to be injected into the reservoir during each cycle time ($2*t_h$), or to determine the rates at which the gas and fluid are injected into the reservoir in order to provide the amounts designated by the ratio function 102. In the illustrated embodiments, the ratio functions 102 initiate at a start of a ratio function time period (represented as $t_{wag}$ in FIG. 1) with a lower (or minimum) non-zero fluid-and-gas ratio threshold or limit (represented as $w_{min}$ in FIG. 1) and terminate at an end of the ratio time period with an upper (or maximum) fluid-and-gas ratio threshold or limit (represented as $w_{max}$ in FIG. 1). The value of the lower fluid-and-gas ratio, the upper fluid-and-gas ratio, and/or the duration of the ratio time period may be based on an available amount of the gas, one or more characteristics of the reservoir, etc. For example, reservoirs having different amounts of resources, having different volumes, having different locations, etc., may have different lower and/or upper limits on the ratios. Alternatively, one or more of these ratios and/or time period may be customized for the reservoir based on other parameters. The ratios and/or time period may be the same for all of the ratio functions 102 in the group of ratio functions 102 that are customized for a reservoir, or two or more of the ratio functions 102 in the group of ratio functions 102 for the reservoir may have different upper limits, lower limits, and/or ratio function times. The limits and/or ratio function times may be determined for the ratio functions 102 of a reservoir to cause increased amounts of the resource to be removed from the reservoir relative to one or more (or all) other limits and/or ratio function time periods.

At 206, gas is injected into the reservoir during a continuous gas injection time period (represented as $t_{cont}$ in FIG. 1) that is defined by the selected ratio function 102. The gas can be injected into the reservoir at a gas injection rate (represented as $q_{co2i}$ in FIG. 1). In one aspect, one or more of the ratio functions 102 in the group of ratio functions for a reservoir include the continuous gas injection time period. The gas injection time period may be the same time period for all of the ratio functions 102 in the group of ratio functions 102 that are customized for a reservoir, or two or more of the ratio functions 102 in the group of ratio functions 102 for the reservoir may have different gas injection time periods. The gas injection time period may be determined for the ratio functions 102 of a reservoir to cause increased amounts of the resource to be removed from the reservoir relative to one or more (or all) other gas injection time periods for the reservoir.

At 208, a determination is made as to whether the gas injection time period has expired. If the time period has expired, then flow of the method 200 can proceed to 208. Otherwise, gas can continue to be injected into the reservoir and flow of the method 200 can return to 206. At 210, the gas is injected into the reservoir at an amount and/or at a rate of a current ratio designated by the selected ratio function. During injection of the gas at 208, the gas is injected without the fluid also being injected. Alternatively, the gas and fluid may be concurrently injected.

At 212, a determination is made as to whether a first part (e.g., the first half or other fraction) of the cycle time has expired. The first part may be referred to as a gas injection portion of the cycle time. If the gas injection portion of the cycle time has expired, then flow of the method 200 can proceed toward 214 to begin injecting fluid into the reservoir. But, if the gas injection portion of the cycle time has not expired, then flow of the method 200 can return toward 210 to continue injecting gas into the reservoir.

At 214, fluid is injected into the reservoir at an amount and/or at a rate of the current ratio designated by the fluid-and-gas ratio function. The fluid may be injected without the gas also being injected. Alternatively, the fluid and the gas may be concurrently injected. During the ratio function time period, the fluid is injected into the reservoir at a fluid injection rate (represented as $q_{h2o}$ in FIG. 1). Because the ratio functions 102 can define different ratios for different times (and may define ratios that continually change with respect to time such that the same ratio is not defined at different times), the ratio designated by the selected function 102 during the time that the fluid is injected at 214 may differ from the ratio designated by the selected function 102 during the time that the gas is injected at 210.

At 216, a determination is made as to whether a second part (e.g., the second half or other fraction) of the cycle time has expired. This second part of the cycle time can be referred to as a fluid injection portion of the cycle time. In one embodiment, upon completion of a cycle time, the ratio of the total amount of fluid that was injected into the reservoir during the preceding cycle time to the total amount of gas that was injected into the reservoir during the preceding cycle time is the same as (or within a designated error tolerance of 1%, 3%, 5%, or the like) the ratio designated by the ratio function for the cycle time. If the fluid injection portion of the cycle time has expired, then flow of the method 200 can proceed toward 218 (shown in FIG. 2B). But, if the fluid injection portion of the cycle time has not expired, then flow of the method 200 can return toward 214 to continue injecting fluid into the reservoir.

At 218, a determination is made as to whether the ratio function time period ($t_{wag}$ in FIG. 1) has expired. If the ratio function time period has completed, then the injecting of fluid and gas in the alternating matter described above may terminate, and flow of the method 200 can proceed toward 228. At 228, the fluid is injected into the reservoir during a chase time period (represented as $t_{chase}$ in FIG. 1). The fluid may be injected without injecting the gas into the reservoir during the chase time period.

In one aspect, one or more of the ratio functions 102 in the group of ratio functions for a reservoir include the chase time period. The chase time period may be the same time period for all of the ratio functions 102 in the group of ratio functions 102 that are customized for a reservoir, or two or more of the ratio functions 102 in the group of ratio functions 102 for the reservoir may have different chase time periods. The chase time period may be determined for the ratio functions 102 of a reservoir to cause increased amounts of the resource to be removed from the reservoir relative to one or more (or all) other chase time periods for the reservoir. The total time period that encompasses the continuous gas injection time period, the ratio function time period, and the chase time period may be referred to as a time horizon (represented as $t_{horizon}$ in FIG. 1).

Returning to the description of 218 of the method 200, if the ratio function time period has not yet expired, then flow of the method 200 can proceed toward 220. At 220, a determination is made as to whether the ratio function currently being used to determine the ratio of fluid and gas being injected into the reservoir should be changed. The ratio function may be changed when one or more parameters change. As one example, the amount of the resource being extracted from the reservoir may be less than expected. Different ratio functions may be associated with lower threshold amounts of the resource that is expected to be removed from the reservoir at different times (when the associated ratio function is used). If the cumulative amount of the resource removed from the reservoir up to the time at which 220 occurs (using the current ratio function) is less than the threshold amount associated with the ratio function (up to the time at which 220 occurs), then the ratio function may be switched to another ratio function.

In another example, the pumping the gas and fluid into one reservoir may impact one or more other reservoirs. A field (e.g., an oil field) may include several interconnected reservoirs. Pumping fluid and gas into one reservoir can change the amount of resource (e.g., oil) in one or more other reservoirs and/or can change the output of the one or more other reservoirs having fluid and gas pumped into the one or more other reservoirs. For example, the fluid and/or gas being pumped into one reservoir can travel into another reservoir and/or some of the resource in one reservoir may be forced by the fluid and/or gas into another reservoir. These types of inter-reservoir impacts of pumping fluid and/or gas into a reservoir can cause a change in the ratio function being used for the reservoir. The output of the reservoir may not be as large or may be larger than expected (e.g., than the threshold described above) for the ratio function. As a result, a change in the ratio function being used may be implemented so that the output of the reservoir is increased or modified to be at least as large as a threshold associated with the updated ratio function.

As another example, the amount of available gas and/or fluid may change, and this change may cause a switch in which ratio function 102 is used to define the ratio of fluid and gas being injected into the reservoir. The amount of gas may change due to new and/or different gas supply equipment being available (e.g., compressors, pumps, etc.), deterioration in the health of the gas supply equipment, an increased cost in the gas, etc. The amount of gas may change due to changes in how much gas is used in one or more other reservoirs. For example, a finite amount of gas may be available at a field having several reservoirs. This gas may be allocated among the different reservoirs for injecting into the reservoirs according to ratio functions being used at the different reservoirs. If the amount of gas used at a first reservoir changes from an expected amount (e.g., by changing the ratio function being used at the first reservoir), then the ratio function being used at a second reservoir may change in order to account for more or less gas being available. If the first reservoir changes ratio functions such that the first reservoir is receiving more gas, then the ratio function for the second reservoir may change so that less gas is injected into the second reservoir. Conversely, if the first reservoir changes ratio functions such that the first reservoir is receiving less gas, then the ratio function for the second reservoir may change so that more gas is injected into the second reservoir. The currently used ratio function 102 may be based on an amount of gas that is different from the amount of gas that is currently available. The ratio function 102 can be switched to another ratio function 102 that is based on the new amount of gas that is available.

If the ratio function currently being used at a reservoir is to change, then flow of the method 200 can proceed to 222. At 222, another ratio function is selected. The ratio function can be selected based on the new or updated parameters described above (e.g., change in equipment, change in gas supply, inter-reservoir impacts, etc.). Flow of the method 200 can then return to 206 (shown in FIG. 2A). If ratio function currently being used at the reservoir is not to change, then flow of the method 200 can proceed toward 224.

At 224, a determination is made as to whether the ratio designated by the ratio function needs to be updated. The selected ratio function 102 can be used to repeatedly update the ratio during the ratio function time period. The ratio functions 102 designate different ratios as a function of time such that different ratios are used at different times. For example, with a first ratio function 102A, a first ratio 108 is used at a first time 110, a larger, second ratio 112 is used at a subsequent, second time 114, and a third ratio 116 is used at a subsequent, third time 118. The larger ratios indicate that increasingly more fluid is being injected into the reservoir and increasingly less gas is being injected into the reservoir.

The fluid and gas may be injected in the amounts or at the rates defined by the ratio designated by the ratio function 102 from a previous (e.g., the most recent) update. After a designated number of cycle times (e.g., two cycle times, or four half cycle times), the ratio function 102 may be checked to determine if a different ratio is to be used. Alternatively, the designated number of cycle times may have another value, or the ratio function 102 may be continually checked to determine the ratio. For example, the ratio may be updated as the fluid or gas is being injected into the reservoir, instead of waiting for a designated number of cycle times to occur. This can result in the rates of injection and/or amounts of the fluid and gas injected into the reservoir continually changing instead of changing only at designated times (e.g., after expiration of one or more cycle times).

If the designated number of cycle times has not completed or occurred since the last update to the ratio, then the fluid and gas may continue to be injected into the reservoir in the amounts and/or at the rates designated by the ratio function and flow of the method 200 can return toward 206 (shown in FIG. 2A) so that the fluid and gas can continue to be injected according to the current ratio. If the designated number of cycle times has completed or occurred since the last update to the ratio, then flow of the method 200 may proceed to 226 to update the ratio. The ratio may be updated at every update ratio time or at an update frequency. Alternatively, the ratio may be updated at other times. If the ratio is not to be updated, then flow of the method 200 can return toward 206 (shown in FIG. 2A).

At 226, the ratio of fluid-to-gas that is being injected into the reservoir according to the ratio function is updated. The ratio may be updated based on an elapsed time. For example, if the first ratio 108 was used for the previous cycle time and the time at which the ratio is updated is the second time 114, then the ratio that is used for one or more upcoming cycle times is the second ratio 112. If the ratio is eventually updated at the third time 118, then the third ratio 116 may be used for one or more cycle times after the third time 118. Upon updating the ratio, flow of the method 200 may return toward 206 (shown in FIG. 2A) to return to injecting gas and fluid into the reservoir according to the updated ratio designated by the ratio function.

Figure 3:
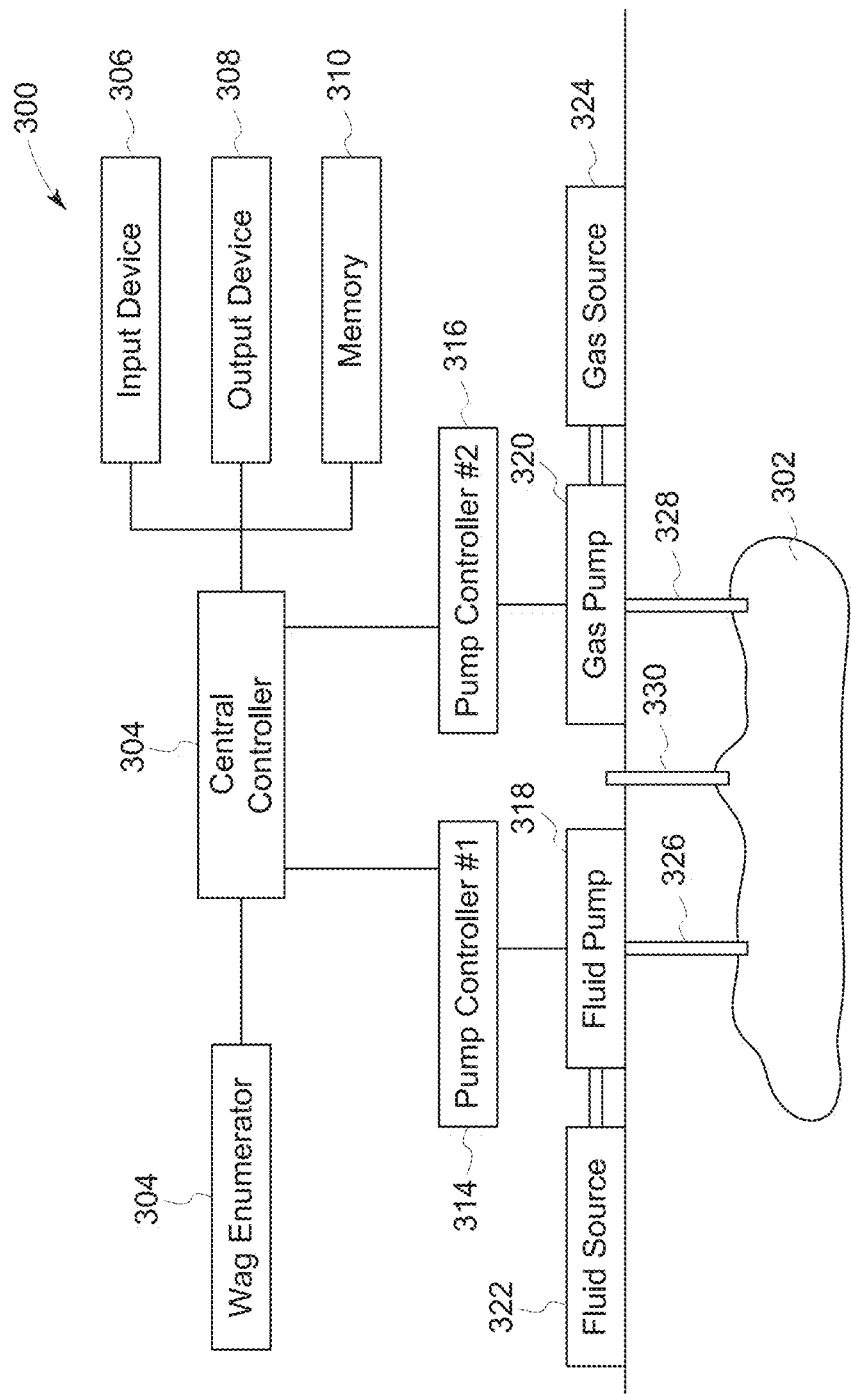
FIG. 3 illustrates one embodiment of a resource extraction system.

FIG. 3 illustrates one embodiment of a resource extraction system 300. The system 300 may be used to implement one or more of the ratio functions 102 (shown in FIG. 1) to extract a resource (e.g., oil) from a subterranean reservoir 302. The components shown in FIG. 3 can be communicatively coupled with one or more other components shown in FIG. 3 by one or more wired and/or wireless connections.

The system 300 includes a central controller 304, which can represent one or more processors (e.g., microprocessors, field programmable gate arrays, application specific integrated circuits, multi-core processors, or other electronic circuitry that carries out instructions of a computer program by carrying out arithmetic, logical, control, and/or input/output operations specified by the instructions). The instructions used to direct operations of the controller 304 may represent or be based on the flowchart of the method 200 and/or other operations described herein.

The controller 304 includes and/or is connected with an input device 306, such as an electronic mouse, keyboard, stylus, touchscreen, microphone, or the like. The input device 306 may receive information from an operator of the system 300, such as a selection of a fluid-and-gas ratio function, user-input constraints on one or more of injection of the fluid or injection of the gas into the reservoir, a type of ratio function, a limitation on a rate of change in the ratios designated by the first fluid-and-gas ratio function, a periodicity limitation on changes to the ratios designated by the first fluid-and-gas ratio function, the cycle time, an update frequency at which the ratio designated by the fluid-and-gas ratio function is updated, an availability of the fluid, an availability of the gas, or other information.

The controller 304 includes and/or is connected with an output device 308, such as a monitor, touchscreen (which may be the same component as the input device 306), a speaker, printer, or the like. The output device 308 may communicate information to the operator of the system 300, such as the ratio function, ratio functions other than or in addition to the selected ratio function, the ratio designated by the ratio function, the rates and/or amounts of fluid and/or gas that have been injected into the reservoir, the rates and/or amounts of fluid and/or gas that are currently being injected into the reservoir, the rates and/or amounts of fluid and/or gas that will be injected into the reservoir, remaining amounts of the gas and/or fluid, the amount of resource extracted from the reservoir, etc.

The controller 304 includes and/or is connected with a memory 310, such as a computer hard disc, read only memory, random access memory, optical disc, removable drive, etc. The memory 310 can store information such as ratio functions, ratios designated by the ratio functions, amounts of available gas and/or fluid, etc.

The controller 304 can communicate with a WAG enumerator 312 that provides ratio functions to the controller 304. As described below, the WAG enumerator 312 can create and/or modify the ratio functions based on various parameters and provide the ratio functions to the controller 304. The WAG enumerator 312 includes or represents one or more processors (e.g., microprocessors, field programmable gate arrays, application specific integrated circuits, multi-core processors, or other electronic circuitry that carries out instructions of a computer program by carrying out arithmetic, logical, control, and/or input/output operations specified by the instructions). The instructions used to direct operations of the WAG enumerator 312 may represent or be based on one or more flowcharts and/or other operations described herein.

The controller 304 communicates with pump controllers 314, 316 ("Pump Controller #1" and "Pump Controller #2" in FIG. 3) to control the rates of injection of the fluid and gas, the amounts of fluid and gas being injected into the reservoir, and/or the times at which the fluid and gas are injected into the reservoir. The controller 304 can direct each pump controller 314, 316 of the amount, rate, and/or timing of injecting the corresponding fluid or gas. In one aspect, the controller 304 can communicate change signals to the pump controllers 314, 316. The change signals may be communicated via one or more wired and/or wireless connections and can instruct the pump controllers 314, 316 of the rates and/or amounts of the fluid and gas that is to be injected into the reservoir 302.

The pump controllers 314, 316 are communicatively coupled with pumps 318, 320 that pump the fluid and gas. The pump 318 is a fluid pump that draws the fluid from a fluid source 322, such as a tank, reservoir (other than the reservoir 302), or body of water. The pump 320 is a gas pump that draws the gas from a gas source 324, such as a tank or other container. The pumps 318, 320 may be fluidly coupled with the reservoir 302 by one or more injection conduits 326, 328, such as wells, tubes, or the like. While the pumps 318, 320 are connected with the reservoir 302 by separate conduits 326, 328 in FIG. 3, alternatively, the pumps 318, 320 may be connected with the reservoir 302 by a single conduit. An extraction conduit 330 fluidly couples the reservoir 302 with space outside of the reservoir 302 (e.g., a location above the surface of the earth). The resource that is in the reservoir 302 may be extracted out of the reservoir 302 via the conduit 330 due to the pumping of the fluid and gas into the reservoir 302 via the conduits 326, 328. The arrangement of injection conduits (or injectors) and extraction conduits (or producers) may be referred to as an "injection pattern." A single reservoir may utilize a number of injection patterns. Embodiments set forth herein may be applied to a single injection pattern, a plurality of injection patterns associated with the reservoir, or all injection patterns associated with the reservoir.

Figure 4:
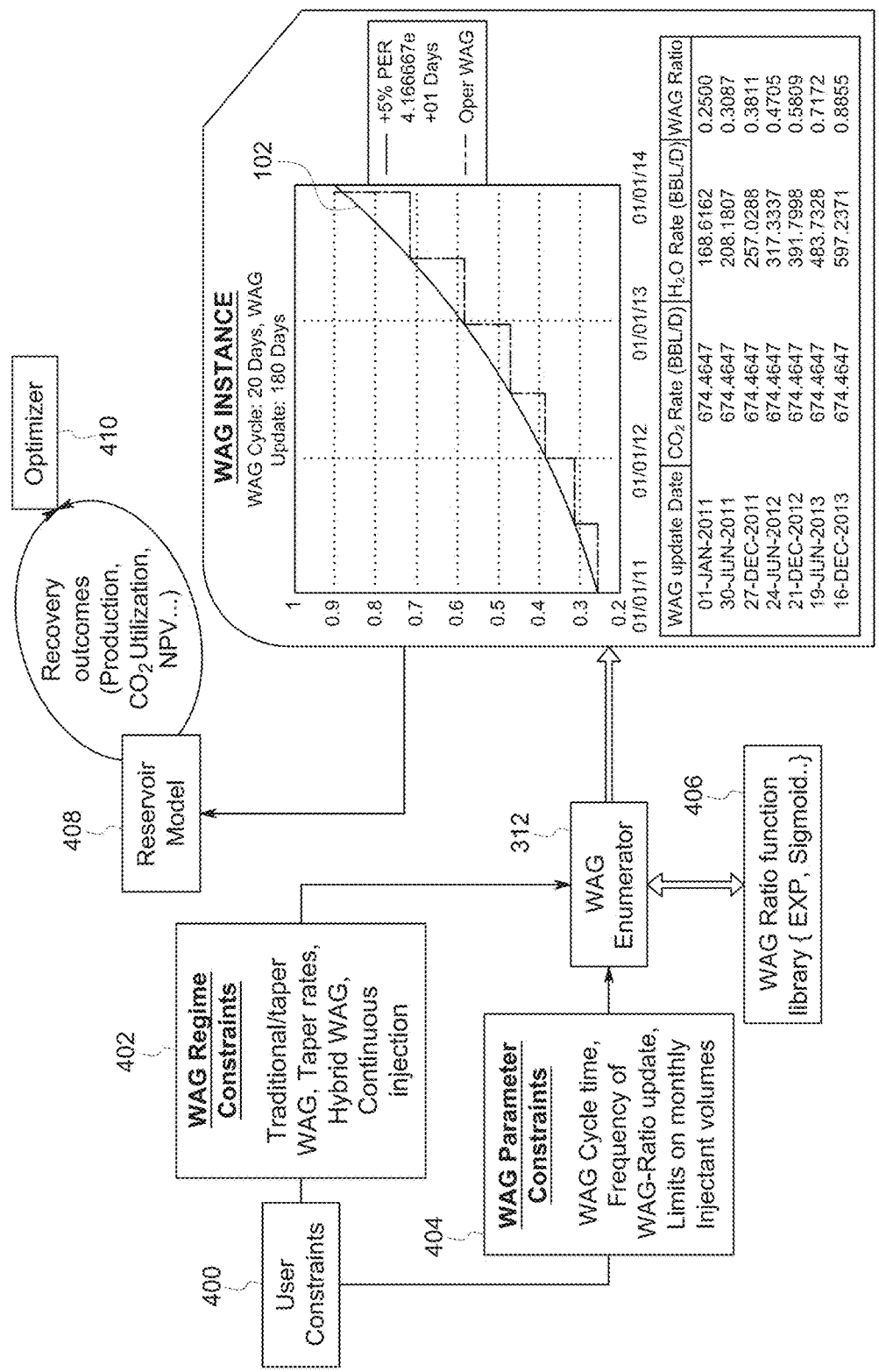
FIG. 4 illustrates operation of a WAG enumerator according to one embodiment.

FIG. 4 illustrates operation of the WAG enumerator 312 according to one embodiment. The enumerator 312 can create and/or modify ratio functions for reservoirs 302. The enumerator 312 can generate a ratio function as a continuous rate at which the ratio of fluid-to-gas being injected into the reservoir should change in order to control the reservoir to have an effective outcome of resource extraction. The enumerator 312 can create at least some of the ratio functions to be curves modeled from families of non-decreasing curves that result in ratios that increase the amount or injection rate of the fluid relative to that of the gas over time. In one aspect, the ratio functions are growth-exponential functions that asymptotically approach but do not reach and/or do not exceed a designated value, such as an upper limit on the ratio of fluid to gas (represented as $w_{max}$ in FIG. 1). Alternatively, the ratio functions may reach or exceed the upper limit. Optionally, one or more of the ratio functions may be curves of a different shape, such as curves based on sigmoid functions.

The enumerator 312 generates and/or modifies the ratio functions using resource extraction parameters. These parameters can include supply and field specific constraints, time horizon of interest for which the ratio function is to be used to extract the resource from the reservoir, outcomes of interest (which can be cumulative resource production, gas usage efficiency, field net-present-value, etc.), or the like. The resource extraction parameters may include inter-resource impacts of pumping fluid and/or gas into interconnected reservoirs in a field. For example, a parameter may indicate a change in the output of a resource from a first reservoir if fluid and/or gas is injected into one or more second reservoirs that are fluidly coupled or otherwise interconnected with the first reservoir. Another resource extraction parameter can include a limitation on how much gas is available to multiple reservoirs in a field, an allocation of gas among the reservoirs, or the like. The resource extraction parameters may be obtained by the enumerator 312 via an input device that is similar to the input device 306 and/or from a memory that is similar to the memory 310 shown in FIG. 3.

The resource extraction parameters can include user constraints 400, such as limitations on the rates of injection of the fluid and/or gas, limitations on the amounts of fluid and/or gas that may be injected, or other user-provided limitations. The rates of injection may be limited based on the equipment available at the reservoir. The amount of fluid and/or gas may be limited due to supply limitations.

The resource extraction parameters can include one or more fluid-and-gas regime constraints 402 ("WAG regime constraints" in FIG. 4), which may include one or more of a type of ratio function ("Traditional/taper wag" and "hybrid WAG" in FIG. 4), a limitation on a rate of change in the ratios designated by the fluid-and-gas ratio function ("taper rates" in FIG. 4), or a continual change indication on changes to the ratios designated by the fluid-and-gas ratio function ("continuous injection" in FIG. 4). The type of ratio functions can designate the shapes of the ratio function or functions. The limitations on the rates of change can include upper and/or lower limitations on how quickly the ratio of fluid-to-gas can change along one or more of the ratio functions for a reservoir. The continual change indication can indicate when the ratios are to be continually updated (and not just updated at the ends of designated numbers of cycle times).

The resource extraction parameters can include one or more fluid-and-gas parameter constraints 404 ("WAG parameter constraints" in FIG. 4). These constraints 404 can include a cumulative amount of the resource that is to be extracted from the reservoir. For example, a designated volume of the oil that is sought to be extracted from the reservoir may be indicated. The constraints 404 can include a designated time period in which to extract the cumulative amount of the resource. This time period can be a time limit on when extraction of the resource from the reservoir is to be completed. The constraints 404 can include a cumulative amount of the gas and/or the fluid that is to be injected into the reservoir during a designated time period ("Limits on monthly injectant volumes" in FIG. 4). For example, due to restrictions on how much gas is available for injection, the constraints 404 can prevent a ratio function from being created that causes more gas and/or fluid to be injected into the reservoir during a designated time period (e.g., every month) than is available for injecting into the reservoir during that time period. The constraints 404 may include a net value of the resource that is to be extracted from the reservoir. For example, this value can represent a current monetary value of oil that is sought to be extracted from the reservoir. The constraints 404 can include a limitation on how frequently the ratio of the fluid-to-gas that is injected into the reservoir is allowed to change ("Frequency of WAG-ratio update" in FIG. 4).

The enumerator 312 can examine the extraction parameters and determine what ratio functions are feasible for use to inject the fluid and gas into the reservoir while not violating the extraction parameters. The enumerator 312 can examine a memory 406 ("WAG ratio function library" in FIG. 4) that is similar to the memory 310 shown in FIG. 3 to identify which ratio functions can be used with the extraction parameters. The memory 406 may store ratio functions, and optionally may store previously used ratio functions for the same or other reservoirs. The enumerator 312 can compare features of the ratio functions to the extraction parameters to determine which ratio functions can be used with the extraction parameters.

For example, the enumerator 312 may avoid selecting ratio functions that would cause fluid and/or gas to be injected at rates or in amounts that exceed the limitations on the rates of injection of the fluid and/or gas, limitations on the amounts of fluid and/or gas that may be injected, or other user-provided limitations. The enumerator 312 also may avoid selecting ratio functions that do not match the type of ratio function identified by the parameters. For example, if the parameters 402 indicate that the ratio function should have the shape of an exponential function, then the enumerator 312 may not select a ratio function having the shape of a sigmoid curve. The enumerator 312 can avoid selecting ratio functions having rates of change in the ratios that exceed the limits on the rates of change in the parameters 402.

The enumerator 312 can select the ratio function or functions that will result in the resource being extracted from the reservoir in an amount that is at least as large as the cumulative amount designated by the constraints 404. This can be determined based on previous uses of the ratio functions (e.g., how much resource was extracted using the ratio functions before), by simulating use of the functions for the reservoir (e.g., based on previously measured rates of resource extraction from a reservoir, the amount of resource extracted using a ratio function can be estimated), or the like. The remaining extraction parameters also may be used to determine which of the ratio functions satisfy or violate the extraction parameters, and the enumerator 312 may select those ratio functions that satisfy the extraction parameters.

The group of ratio functions 102 that are selected as satisfying the extraction parameters can be evaluated by the enumerator 312 using a reservoir model 408. The reservoir model 408 includes a number of algorithms that represent the flow of fluid through the reservoir. The reservoir model 408 may be used to generate a computer-implemented simulation of using different functions of the selected ratio functions to extract resources from a reservoir. The simulation may involve examining the ratio functions that previously were used to extract resources from different reservoirs to determine the results of using the different ratio functions. For example, the enumerator 312 may examine previously used ratio functions to determine if the ratio functions are the same or similar to the ratio functions selected based on the resource extraction parameters. The previously used ratio functions may be similar to the selected ratio functions if one or more of the resource extraction parameters of the previously used ratio functions are the same as the selected ratio functions. The enumerator 312 also may examine the reservoirs from which the previous ratio functions were used to extract resources. These previous reservoirs may have characteristics that are similar to or the same as characteristics of a reservoir for which the enumerator 312 is attempting to determine the ratio functions (referred to as a current reservoir). For example, the previous and current reservoirs may have the same or similar (within a designated threshold, such as 1%, 3%, 10%, or the like) volume of resources, be of the same or similar size, be the same or similar depth beneath the surface of the earth, etc. The enumerator 312 can examine the previously used ratio functions and previous reservoirs to determine how the different ratio functions operated. The enumerator 312 can then estimate how the selected ratio functions for the current reservoir are likely to operate based on this history of previous ratio functions and reservoirs. In one aspect, the enumerator 312 can modify one or more aspects of the ratio functions based on the extraction parameters. For example, a previously used ratio function may need to be modified due to a limited supply of gas for injecting into a reservoir.

Based on this estimated performance of the different selected ratio functions, one or more of the selected ratio functions may be identified by the enumerator 312 as "optimized" ratio functions 410 ("Optimizer" in FIG. 4). An "optimized" ratio function includes a ratio function that is customized for a reservoir, which may or may not include the best possible ratio function for that reservoir. In one embodiment, an optimized ratio function may generate the largest possible amount of resources from a reservoir, but alternatively may not generate the largest possible amount. In another embodiment, the optimized ratio function may generate the maximum profit of extracting the liquid the reservoir. An optimized ratio function may improve one or more metrics compared to other possible ratio functions. As used herein, the phrase "improve one or more metrics-of-interest" may include using a multi-variable function (e.g., objective function, cost function, profit function, and the like) that includes a plurality of variables representing the metrics in which the multi-variable function is analyzed to identify the values of the metrics that provide a desired outcome (e.g., the best outcome). The metrics may include NPV, $CO_2$ utilization, oil production, impacts to commodity supply, new operational constraints, or cash flow. A metric may be limited by a certain time period. For example, a multi-variable function may be used to identify a schedule that provides an improved NPV and an improved cash flow for the next three years. It should be understood that other possible metrics than those described above are contemplated. It should also be understood that the phrase "improve a metric-of-interest" does not exclude the possibility that other metrics-of-interest may also be improved.

The group of ratio functions 410 may then be presented to an operator of the system 300 for selection. The enumerator 312 can communicate the ratio functions 410 to the central controller 304 for presentation on the output device 308 and the operator of the system 300 may select a ratio function for implementation with a reservoir using the input device 306. Alternatively, the enumerator 312 may include the input and output devices 306, 308 for outputting the group of ratio functions and receiving a user selection of a ratio function.

Figure 5:
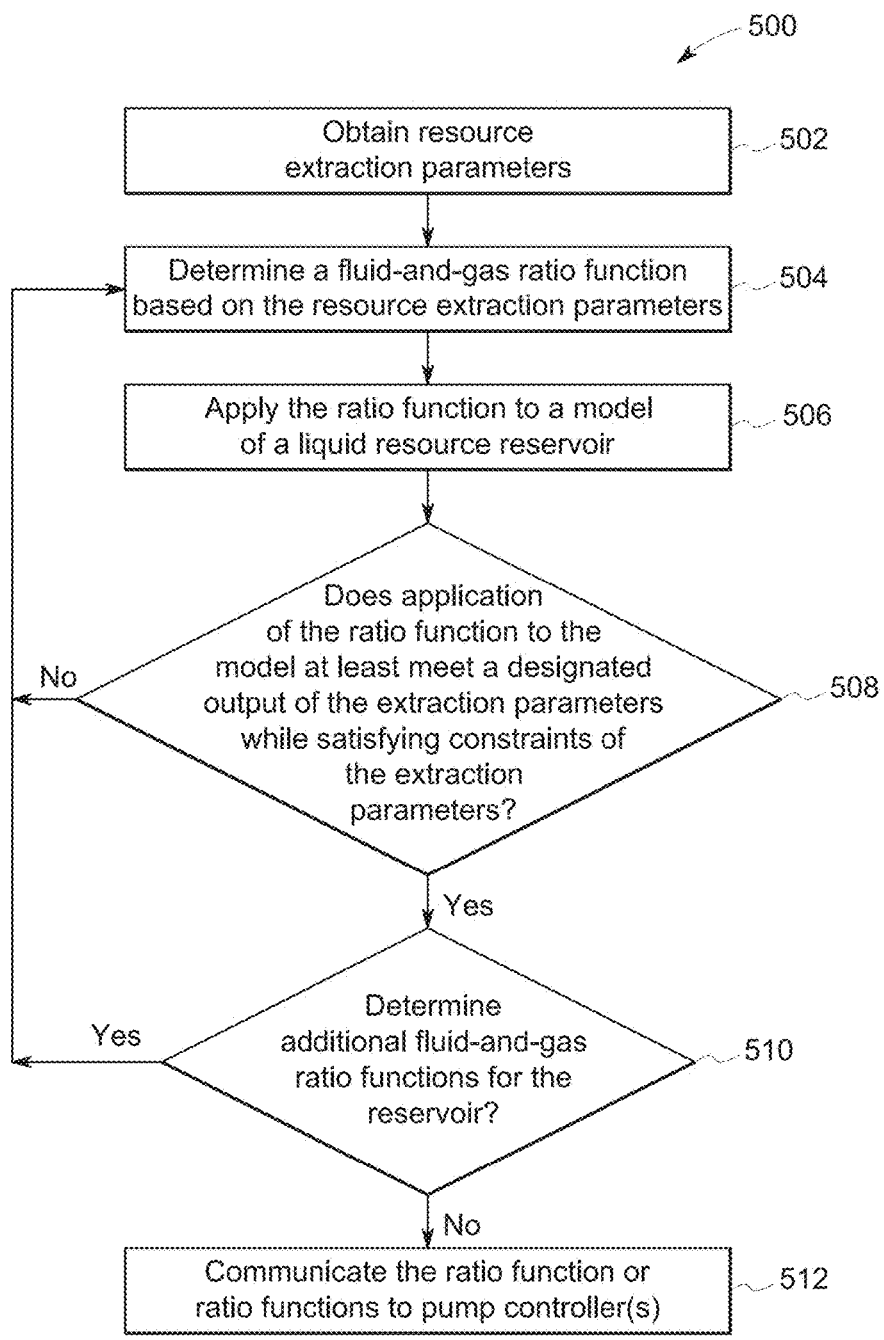
FIG. 5 illustrates a flowchart of a method for determining a ratio function for a reservoir.

FIG. 5 illustrates a flowchart of a method 500 for determining a ratio function for a reservoir. The method 500 may be used to identify ratio functions used to obtain a resource, such as oil, from a subterranean oil field. The method 500 may represent an algorithm and/or be used to generate a software program that determines customizes ratio functions for different reservoirs.

At 502, resource extraction parameters are obtained. The parameters may be obtained from a memory, from input provided by an operator of the system, or the like. The parameters can include characteristics of the reservoir, supplies of gas and fluid, limitations on the ratio functions that are to be customized for a reservoir, or the like, as described above. At 504, a fluid-and-gas ratio function is determined based on the resource extraction parameters. The ratio function can be selected by examining several ratio functions to determine which of the ratio functions satisfy requirements of the resource extraction parameters while avoiding violating limitations of the resource extraction parameters.

At 506, the selected ratio function is applied to a model of a reservoir (or reservoir model). The ratio function may be applied to the model by simulating extraction of the resource from the reservoir using the ratio function. The simulation may be performed by estimating how much of the resource in the reservoir is estimated or calculated as being extracted if the ratio function is used to control injection of gas and fluid into the reservoir. The simulation may be based on previous extractions of resources from other reservoirs having common characteristics as a currently examined reservoir.

At 508, a determination is made as to whether application of the ratio function to the model of the reservoir meets at least a designated output of the extraction parameters while satisfying constraints of the extraction parameters. For example, the extraction parameters may provide a lower output limit that represents a lower limit on how much of the resource is to be extracted from the reservoir. If simulation of the ratio function does not result in at least the lower output limit being extracted from the reservoir, then the ratio function may be discarded from consideration. As a result, flow of the method 500 can return to 504 so that one or more additional ratio functions may be identified and evaluated as described above. If simulation of the ratio function does result in at least the lower output limit of the resource being extracted from the reservoir, then flow of the method 500 can proceed toward 510.

At 510, a determination is made as to whether any additional ratio functions are to be determined. For example, if no other ratio functions exist that satisfy the extraction parameters, then flow of the method 500 can proceed toward 512. As another example, if no other ratio functions exist that can be compared to the model of the reservoir, then flow of the method 500 can proceed toward 512. Otherwise, flow of the method 500 can return toward 504 so that one or more additional ratio functions may be identified and evaluated as described above.

At 512, the ratio function or functions are communicated to a pump controller. In one aspect, the ratio functions may be communicated to a system that includes the controller so that an operator or the controller can select a ratio function for implementation. The ratio function or functions may be implemented by the system to control the pumping of gas and fluid into the reservoir, as described above.

The following description is with respect to one example of generating a designated work schedule for providing a working fluid into a reservoir to extract a resource fluid (e.g., oil). It should be understood, however, that the systems and methods set forth herein may be applied to other reservoirs.

Figure 13:
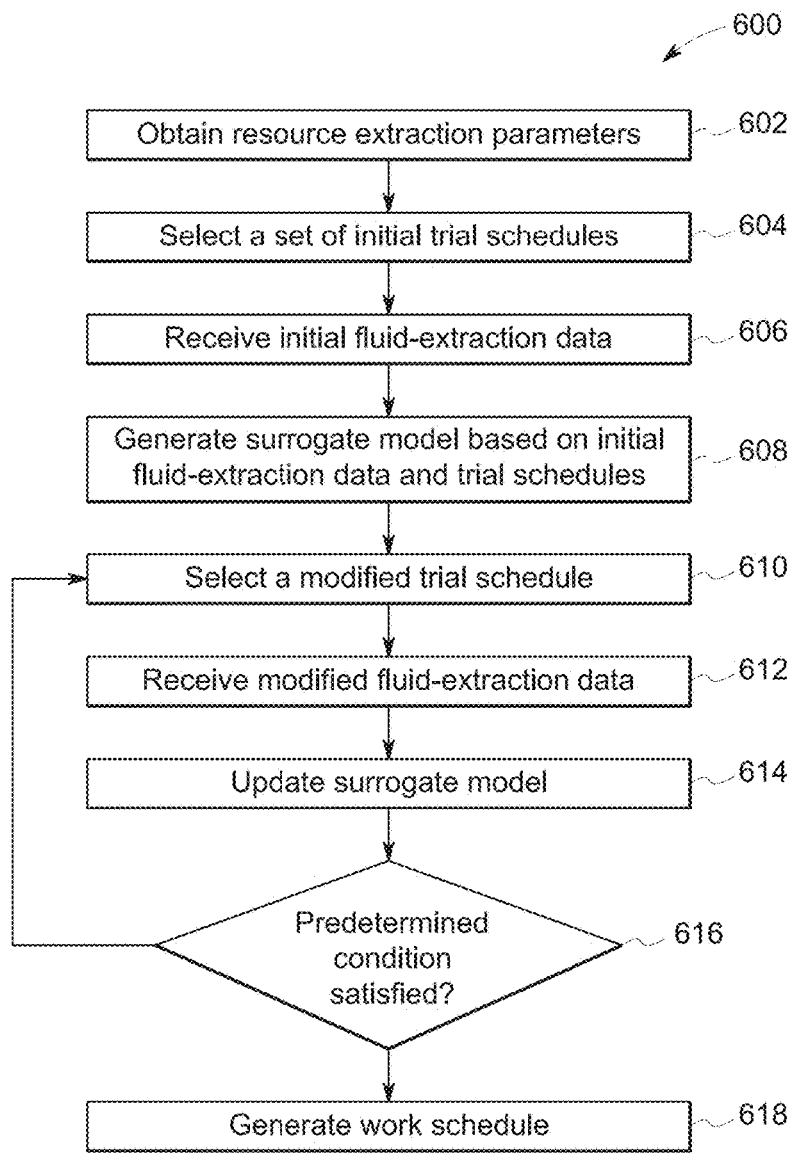
FIG. 13 illustrates a flowchart of a method in accordance with an embodiment.

Given limited $CO_2$ supply, operational constraints, and pattern specific reservoir performance, a work schedule (or ratio function) can be customized such that NPV or other metrics are improved. The metrics may include NPV, $CO_2$ utilization, oil production, impacts to commodity supply, or new operational constraints. Other possible metrics are contemplated. Depending on the work schedule, recovery can fluctuate between 5-15% at the pattern scale due to reservoir heterogeneity causing variations in sweep efficiency. An analytical method and system is disclosed (FIG. 13). In certain embodiments, the method improves work schedules by coupling traditional reservoir modeling and simulation with machine learning, enabling the discovery of improved work schedules that increase recovery. A history-matched reservoir model of an exemplary reservoir was sampled to perform predictive reservoir flow simulations and artificially build an intelligent reservoir model (e.g., surrogate model) that samples a broad range of possible work schedules for improving one or more metrics (e.g., NPV, net utilization rates of $CO_2$, etc.). The intelligent model (or surrogate model) may be used to analyze a plurality of initial trial schedules and generate sequential modified trial schedules to investigate in the numerical simulator. Simulations of the sequential modified trial schedules will converge on the optima, quickly reducing the number of total trial schedules investigated.

Different trial schedules have different values of the resource extraction parameters for providing the working fluid into the reservoir. The initial trial schedules are distributed with respect to one another in a sample space. Optionally, the sample space may be infinite. The initial trial schedules are distributed to provide an overall view or landscape of the sample space in order to select the next schedule (e.g., modified schedule) to be investigated.

Figure 6:
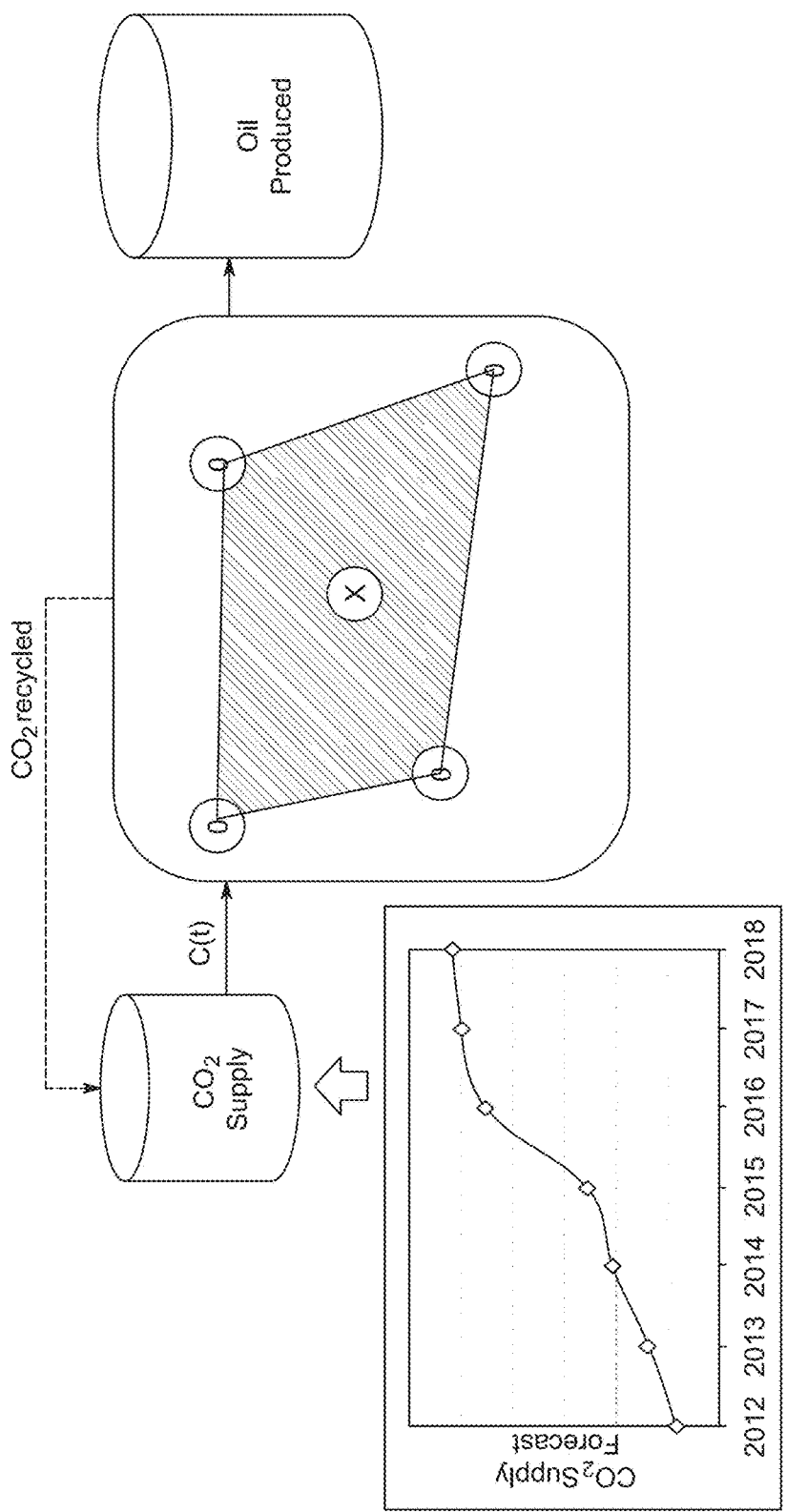
FIG. 6 illustrates a schematic diagram for improving production according to one embodiment by determining a schedule or plan to extract fluid from a reservoir.

Presently, work schedules are typically determined by consideration of analogs (e.g., similar reservoirs) where such analogs exist and numerical simulation where analogs do not exist. For any one injection pattern a large number of potential work schedules may exist due to the uniqueness of a reservoir and operational considerations that would improve production. When using numerical simulation to determine a designated work schedule (in terms of NPV), it would be particularly onerous to evaluate each schedule individually. Accordingly, in some embodiments, an intelligent reservoir model (or surrogate model) may be used. The intelligent reservoir model may be based on machine learning. The basis of optimization is a basic input-output problem to improve the efficiency of $CO_2$ injected and drive NPV (FIG. 6). The results of the optimization process provide a long term forecasting target and an intelligent reservoir model that can update or investigate other work schedules quickly.

The designated work schedule may then be implemented in the field and provide validation and a proof of concept for the remaining injection patterns in the field. The optimization problem was arranged by the optimizer 410 to tailor the WAG so that NPV was improved for an injection pattern in the field over a 15 year time frame. Besides NPV, the optimization methodology may also include $CO_2$ utilization, oil production, or impacts to commodity supply or new operational constraints.

The resource extraction parameters investigated include time horizon, initial $CO_2$ amount (slug size), half cycle, half cycle rate change, half cycle update time and alternating $CO_2$ and water slug sizes (FIG. 1). Alternatively, or in addition, other resource extraction parameters may include the rate or amount of a fluid (e.g., water) and a gas (e.g., $CO_2$) being injected into the reservoir, the time at which the injectant (e.g., the fluid and the gas) being injected into the reservoir changes to the other injectant, and times at which to change the rates or amounts of the injectants and/or the times at which the injectants are switched. The maximum and minimum values of each parameter were set with consideration of actual operational and geological constraints. Operational considerations include maximum water and $CO_2$ available for injection. Geological conditions include fracture pressure of the reservoir and injectivity for that well. Parameters included in the calculation of NPV, include; $CO_2$ purchase cost, $CO_2$ recycle cost, water cost, lifting cost, and oil prices.

Theoretically, the number of possible work schedules to investigate is infinite. A regression analysis could be done to find a preferred work schedule that optimizes one or more (or a combination of metrics), but the analysis could include several runs to come to a conclusion and exercising them in numerical simulation is time consuming. Prediction scenarios in this study utilized machine learning to converge on a local minima in 16 simulation runs to optimize NPV in a relatively short time frame. The process uses a fraction of the simulation cases to arrive at a similar conclusion compared to classic design of experiment methods. Using such a process is critical when large field models exist and a simulation case could take hours or days to run.

Figure 7:
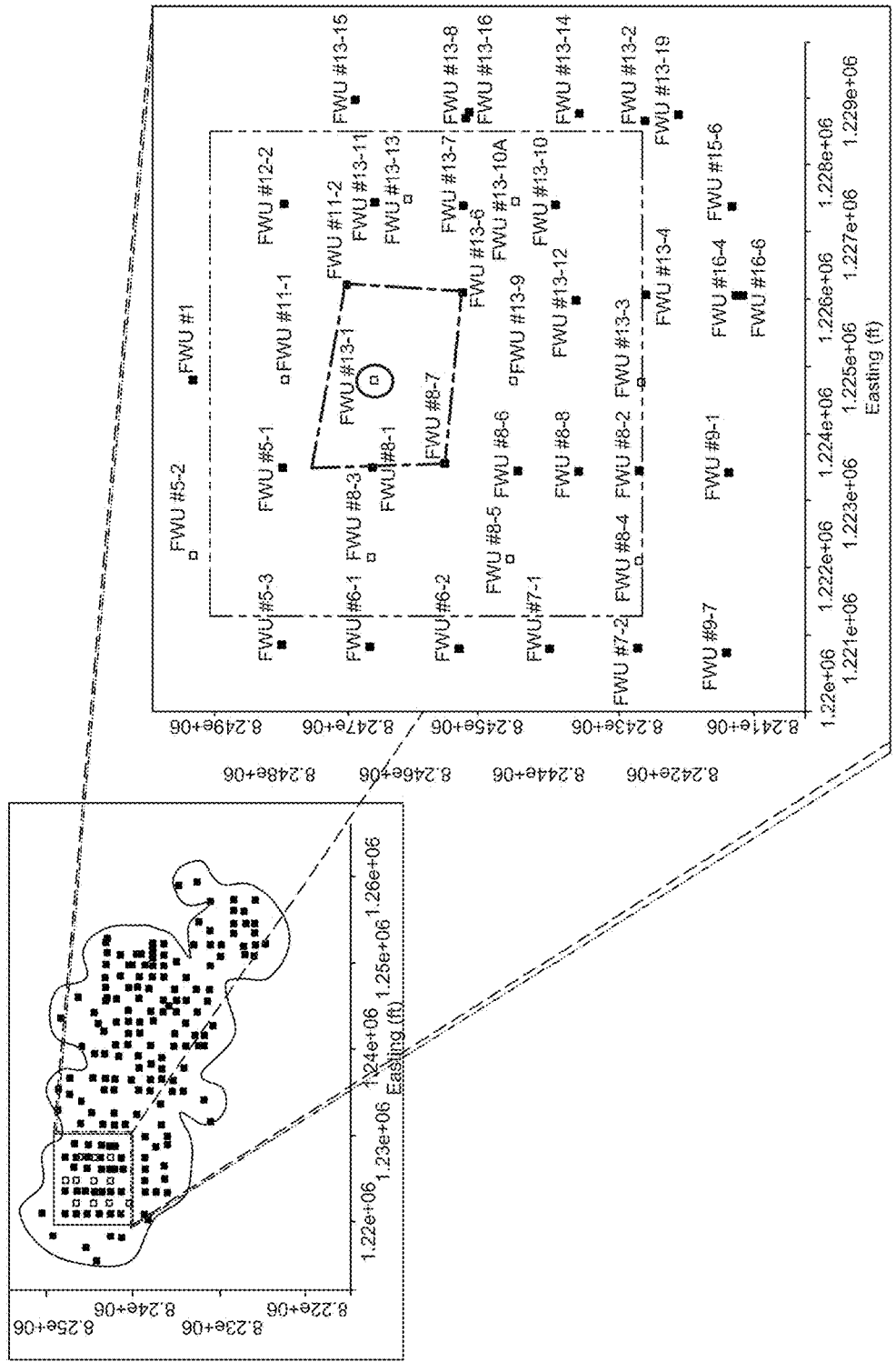
FIG. 7 illustrates a target 5-spot injection pattern for a sector of a reservoir according to one embodiment of a method and system for determining a schedule to extract fluid from a reservoir.

The process to optimize the WAG starts with the traditional geomodelling and fluid flow history matching workflows prior to prediction. A geomodel was constructed for a sector of the reservoir to focus in on a target 5-spot injection pattern (FIG. 7). This injection pattern was chosen due to poor understanding of its performance and poor communication between the injector and producers to the west. The sector model includes the 5 spot injection pattern and 3 surrounding injectors to help understand the communication and boundary effects in this area and ensure model fidelity. In FIG. 7, the large square is the boundary of the geological sector model, the small square is the injection pattern of focus and the highlight well encircled is the injector of focus to determine optimal WAG.

Available reservoir static and dynamic data was employed to construct a fully compositional simulation model to history match the pilot area based on the performance analysis. Screening of the production and injection, PVT, and relative permeability data was applied to ensure the input quality and was then re-interpreted and validated before being utilized in the simulation model. Conventional history matching was conducted to match the model response to the pattern performance. A history matching assist tool was used to further quantify and assess the range of uncertainties for different reservoir parameters that would impact the quality of the history match.

The model was tuned to match primary and secondary recovery stages (tertiary mode was not matched due to the short time window of data), and then was directly applied to 4.5 years of $CO_2$ EOR injection as a semi blind-test. There was a good match at one of two targeted production wells and a fair match at the other (a new drill). During the history match process, key indices investigated were water cut, pressure, and all rates of gas, water, oil, and liquid.

There were two previously unforeseen/unexpected findings from the history-match process. One is injection leakage around the modeling area and the other is a potential barrier between the injector and neighboring producers to the west of the injector. By analyzing all data, the barrier was a fault. The portion of liquid leaking was quantified based on reservoir pressure response to instruct the quantifications of injection impact on neighboring injection patterns. These new learnings demonstrate that an improved understanding of the reservoir allows for optimization by altering current operations.

A traditional approach to analyze WAG optimization analysis using numerical simulation involves constructing a history-matched model of the reservoir and performing predictive simulation. The simulation accounts for 1) the impact of WAG, 2) parameterizing WAG so that a broad array of WAG production scenarios can be expressed or represented in the model and 3) invoking the reservoir model to discover the WAG production scenario that results in the optimal outcomes (production, NPV, URNet etc.). As mentioned, there is a need to discover the optimal WAG design without having to evaluate all possible WAG production scenarios (which can be infinite in theory). However, a traditional model-based optimization run might still need to evaluate the model across a broad array and potentially large number of input scenarios before it can begin to converge on the scenario that yields the optimal outcome. This is a challenge due to the run-time complexity of the reservoir model 408 and the optimization may take months to solve before it converges. Interrupting the optimizer 410 before it converges can result in curtailing the discovery process and identifying a sub-optimal WAG design. Thus, the need to balance the time-complexity of the optimization experiment with its likelihood of discovering the globally optimal solution is at issue. This is the classic exploration versus exploitation dilemma with respect to which areas of the input space are evaluated in the quest of global optima.

Machine learning technologies can be used effectively to address this challenge for discovering the global optima solution in a relatively short time frame. Machine learning abounds with techniques for building models from data, more commonly referred to as regression. These techniques try to extract functional relationships that are implied in the data. The extraction of this functional relationship is done in a manner such that it explains the historical data well and does it in a manner that does not over-fit the data. By not over-fitting, the functional relationship captured by the regression model is expected to generalize to data that belongs to the same problem, but was not used in the construction of the model. This gives the model the ability to be predictive—namely predict the value of an unknown variable (or variables) using the variables with known values.

Figure 8:
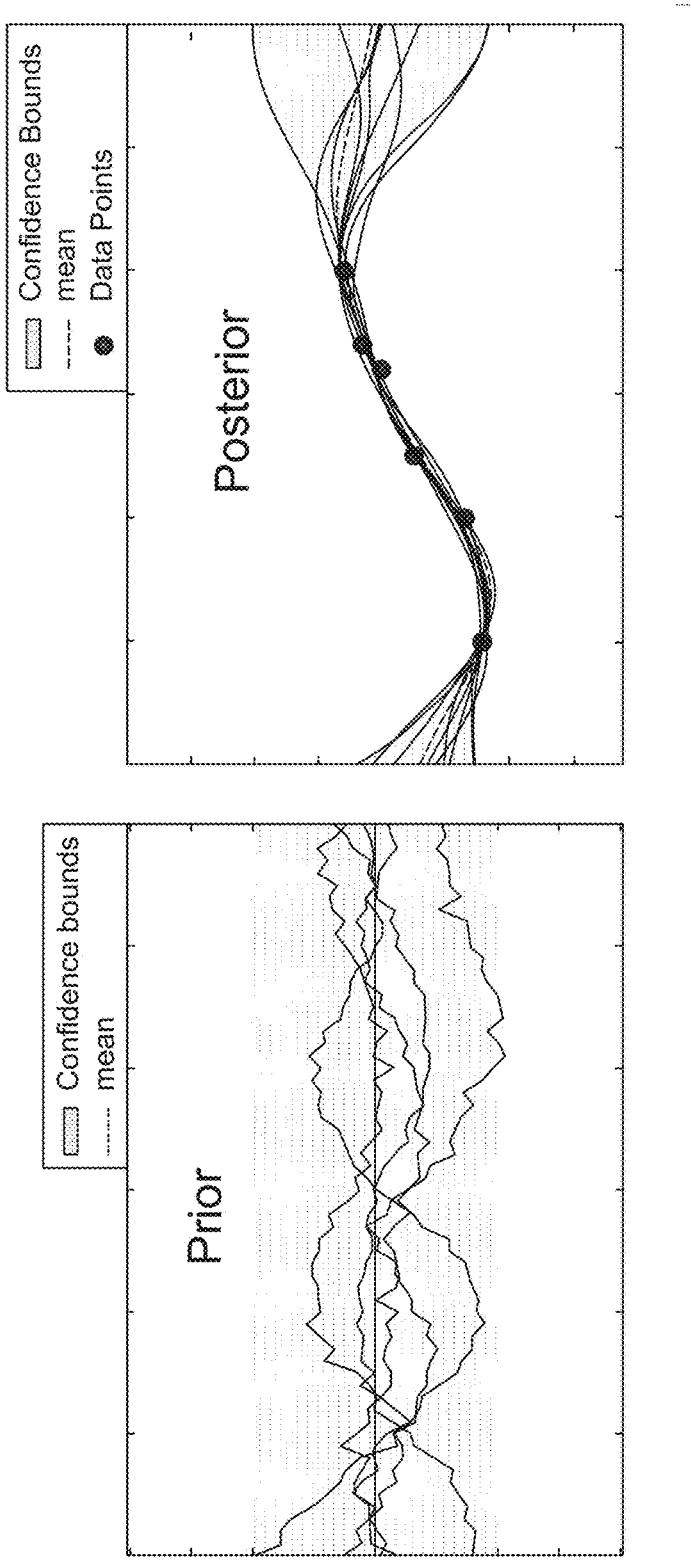
FIG. 8 illustrates graphs showing the use of Gaussian Processes (GP) as a means to build a surrogate model of the underlying response surface using the sampling according to one embodiment.

An effective machine learning approach for regression includes the use of Gaussian Processes (GP) as a means to build a surrogate model (or transfer function) of the underlying response surface. Gaussian Processes characterize an unknown function in terms of a Gaussian distribution over functions, fully specified by a mean value and a correlation structure on the sampling input space, expressed as a kernel function (FIG. 8). The mean value models the expected value of the underlying function being modeled and the kernel models the properties of the input-output response surface like smoothness. Starting with an infinite set of functions, the process works by narrowing down the function-set. This is accomplished by conditioning it on actual values of the current set of sample evaluations using Bayesian estimation. In FIG. 8, the box on the left does not have data. The box on the right contains Gaussian process samples depicted by the lines and data points depicted by the black points. FIG. 8 shows how a prior set of functions narrow down to a more coherent set after having sample evaluations at the black points. The newly conditioned set of functions provides an estimate of the new mean as well as the variance at different locations in the sample space (indicated by the gray bands).

The primary advantage of regression models is that they run almost instantaneously. This allows exploration of the idea of building regression models to emulate the underlying complex reservoir model. In this approach, an appropriate design of experiments approach is typically used to select the input samples (or trial schedules) that are evaluated using the reservoir model and used as data for constructing the regression or surrogate model.

The construction of a surrogate model for an existing reservoir model evaluation of the reservoir model at pre-selected regions in the input space to ensure that the data will enable the regression model to capture the input-output relationship across the entire range of the input space. This can be quite challenging since it is not known how the output response surface behaves with respect to the input. Thus, it is not known which regions have higher complexity and non-linearity and which regions are relatively smooth. Prior knowledge of the response surface would be beneficial in order to be able to adequately design the sampling to be denser in regions that are complex and relatively sparser in regions that are smooth. This would allow the regression model to generalize better across the entire response surface. However, given that each sample run is expensive, evaluating samples (or trial schedules) that are redundant with respect to a previous sample in terms of information content should not be done. If sample evaluations were not time-complex, standard design of experiments techniques like space filling designs and evaluate a large enough sample set to capture the complexity of the response surface could be used. Given only a handful of samples can be evaluated, in numerical simulation, it becomes imperative to be information-driven and accurate in the choice of the samples. This is the reason to employ intelligent sampling techniques. The singular noun "sample" or plural noun "samples" may be considered as a trial schedule or trial schedules, respectively, in this description.

Intelligent sampling addresses the exploration versus exploitation dilemma by sampling adaptively and sequentially, as opposed to more traditional sampling methodologies that construct an entire sample set as a single batch. Sequential sampling proceeds by sampling iteratively, typically one sample at a time, for evaluation. Every subsequent sample is designed by exploiting the additional information about the response surface gained from the samples evaluated thus far. By virtue of being adaptive in this fashion, sequential sampling can help understand and model the response surface well with a relatively smaller number of samples compared to more traditional sampling techniques.

Figure 9:
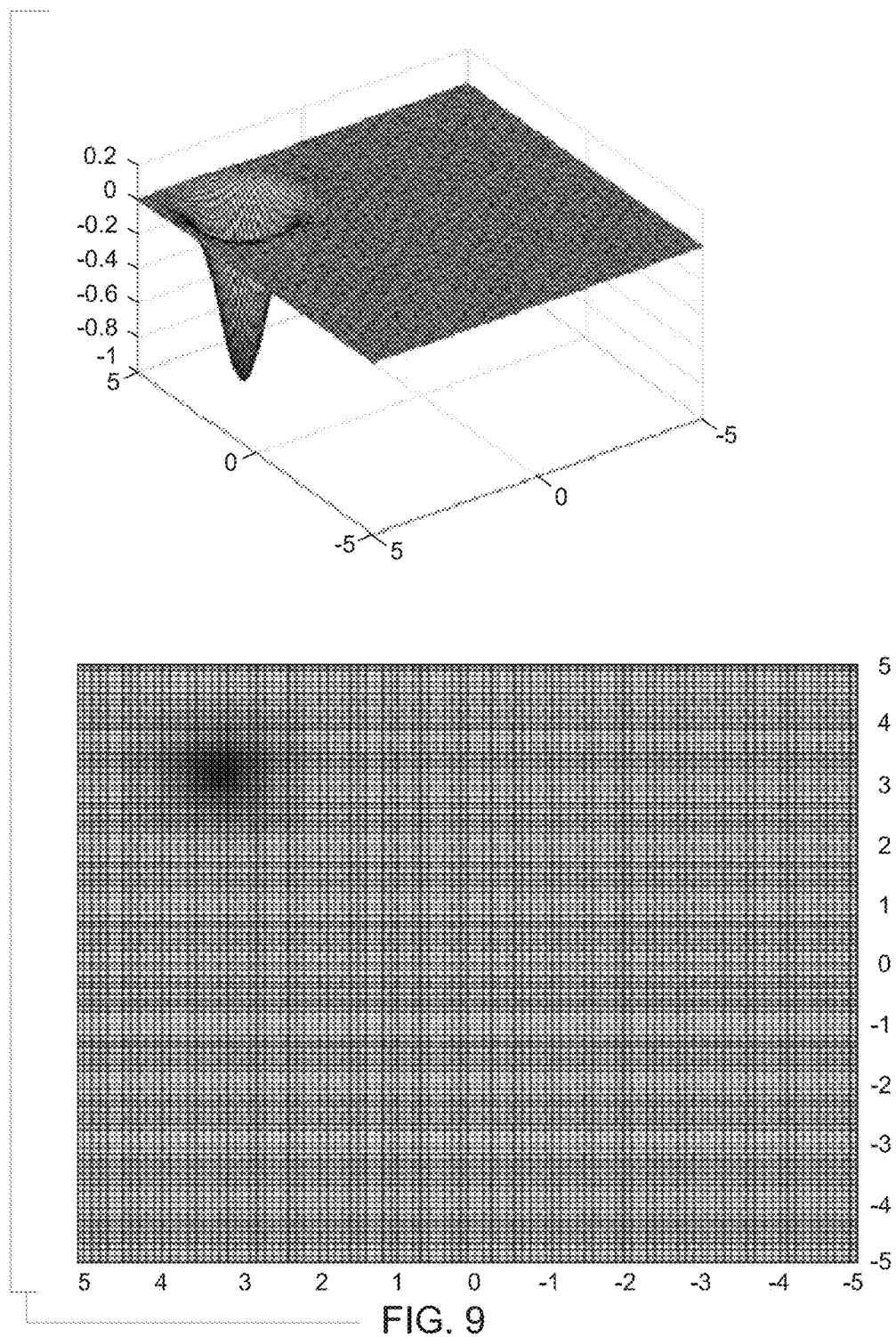
FIG. 9 illustrates the Easom benchmark test function.

To give a better idea for the need to sample smartly, consider the example presented in the figure below, which is the Easom benchmark test function (FIG. 9). Assume that the bottom 2 axes represent input and the vertical axis represents an output for which we want to construct an adequate regression model. Given that the response surface is largely flat and uninteresting, one would not want to waste too many samples in this region, besides doing so to ensure coarse coverage of the range of the inputs. Conversely, the interesting region in the response surface with the spike warrants drawing more samples to help capture the complexity adequately. A uniform sampling methodology like a space filling design coupled with the ability to only draw a few samples will likely not respect that requirement and will potentially sample the largely uninteresting region a lot more than necessary and at the expense under-sample the interesting region than desirable.

Selection of the new sample is done based on the underlying problem for which the samples are being extracted. In the absence of any further information, new samples are typically selected in regions where the variance of the posterior set of functions is the highest (this is often referred to as exploration). If there is additional information available (suppose we are trying to optimize the response to be minimum) then selection of the new sample is not only driven by the areas of high variance or uncertainty, but also areas where the mean value of the GP is low (also referred to as exploitation). In the latter case, typically this trade-off between exploration and exploitation is done by computing an acquisition function over the entire sample space and selecting the next sample at the location where the acquisition function is improved. The acquisition function may be characterized as a multi-variable function in which one variable is uncertainty and another variable is a parameter or metric to be improved. In some embodiments, more than one parameter or metric may be improved. The selection of the next sample (or trial schedule) is not based on uncertainty.

The location of the faults and reservoir heterogeneity indicates that a unique solution is needed to optimize at the pattern level. The intelligent sampling method and surrogate modeling creation was applied to solve for the five variables that can be controlled to improve an injection pattern (Table 1). To investigate the five dimensional space and impact on this injection pattern, an initial 10 random samples (or trial schedules) were selected for simulation over a time period of 15 years. This initial set of samples provided the best balances between exploration and exploitation by directionality providing a response and information for the promising regions to sample next. This was continued iteratively, one sample at a time, until an appropriate stopping criterion (or predetermined condition) is reached, which might be either convergence (or lack of improvement) in the outcome or a time-based criterion.

TABLE 1

| | Variable or Parameter Name | Min | Max | Description of Variable or Parameter |
|---|---|---|---|---|
| A | WAG half cycle (days) | 30 | 120 | Symmetric time-period for alternating water and $CO_2$ in the WAG period |
| B | WAG $CO_2$ rate (mSCF/d) | 1122 | 2244 | Injection rate for $CO_2$ during the WAG period |
| C | WAGr_hi | 0.5 | 1.2 | Maximum value of the WAG ratio up to which the WAG is tapered starting from current field value of 0.54 |
| D | Wag-ratio profile parameter | 0.5 | 4.0 | A parameter that specifies the shape or profile for tapering the WAG |
| E | Wag-ratio update freq (wag-cyc) | 1 | 3 | The operational time-period by which the actual WAG ratio is changed for the field |

Figure 10:
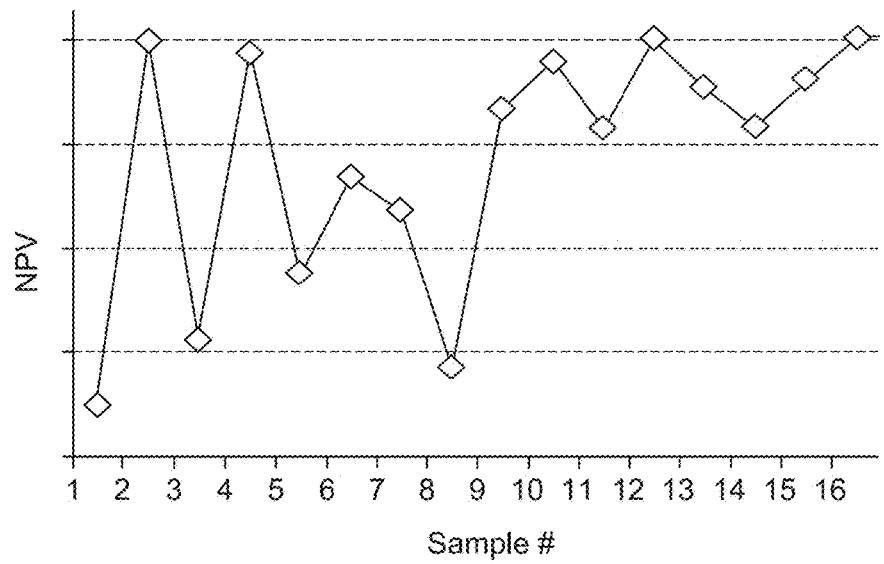
FIG. 10 is a graph illustrating a trial number and net present value (NPV) obtained after the trial.

The sequential sampling focused on maximizing NPV and iteratively sampled different WAG configurations from the variables in Table 1. This process continued until no significant improvement was seen in NPV (FIG. 10). The intelligent samples discovered 8 optimization cases that increased NPV while reducing net utilization of the $CO_2$, when compared to the base case. This sampling approach resulted in 16 samples being evaluated in the fluid flow simulator resulting in a reduction of approximately 66% compared to a full central composite design approach which would have been needed to create a good regression model with the same amount of variables.

Figure 11:
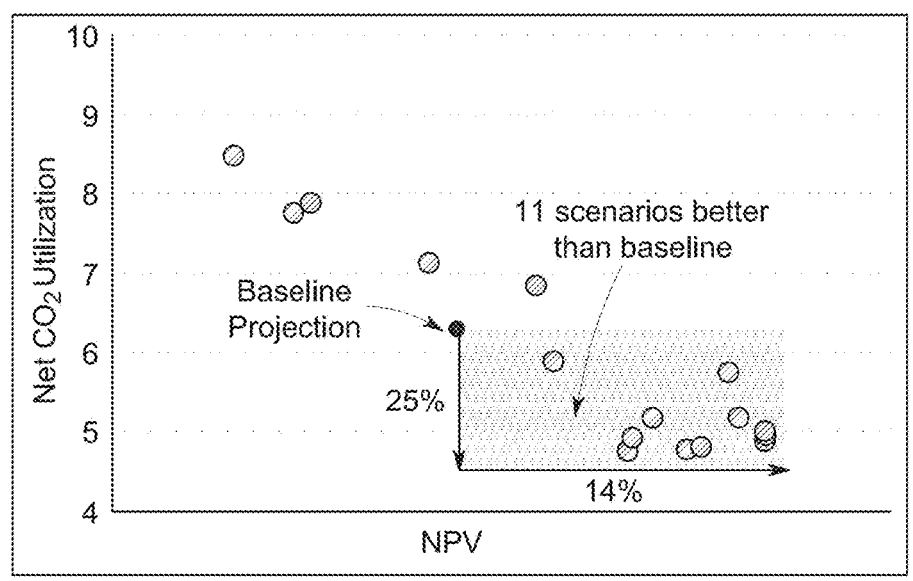
FIG. 11 is a graph showing the net $CO_2$ utilization versus NPV.
Figure 12:
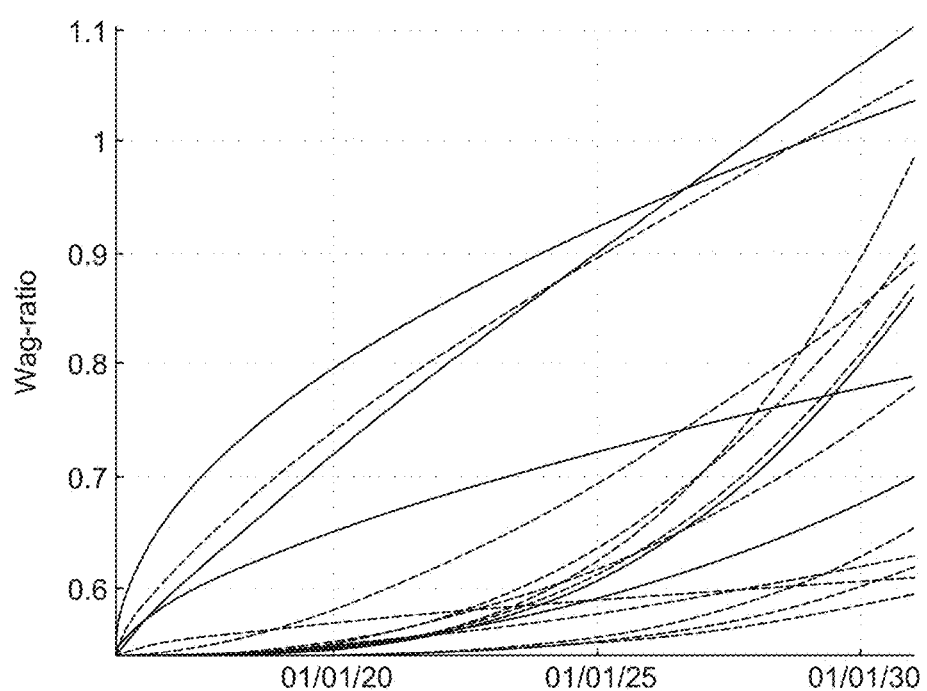
FIG. 12 is a graph showing WAG ratio over time.

For the injection pattern being investigated $CO_2$ utilization was reduced by 25% from the base case operations and NPV increased by 14% (FIG. 11). Additional samples show improvement above the baseline conditions. Ideally the case with the best NPV would be the best case to employ into the field. However, operational constraints were used for the optimization and depending on the operational control variable, some are easier to deploy in the field. FIG. 12 shows different water tapering profiles that could be deployed in the field. The ones indicated in bold faced black are those that are intelligent samples and near the optima but are relatively different. Additionally, some of these cases require the injection to be changed more frequently in the field due to short cycle durations or may require more water and $CO_2$. Depending on the operator, certain schedules may be easier to manage and deploy. This is why having multiple samples near the optima is better than using a uniform sample methodology and allows for various options to manage the reservoir.

After the optima NPV was reached we evaluated other cases outside the original constraints. The first follow-up case went outside some of the operational constraints lowering the $CO_2$ and water injection volumes. The result included some scenarios to converge near the optima but reduced injection too much and dropped the reservoir below MMP. Another case investigated variable rate control at the producers. Although the results increased NPV significantly, to implement this in the field would be constrained by surface operation capabilities. This shows that understanding ones constraints is important when implementing results into the field when addressing optimization and evaluating If a constraint is increased or decreased after the optimum has been reached then the process of optimization needs to start over. This could be due to changes in facilities or equipment. However, the use of the sequential optimization tool can help the operator re-evaluate the constraints quickly without having to rerun multiple simulation runs that could take months to evaluate. The use of this technique can significantly aid in decision making and automating the process to improve management of the reservoir and understand different available strategies by improving utilization rates and NPV.

Figure 14:
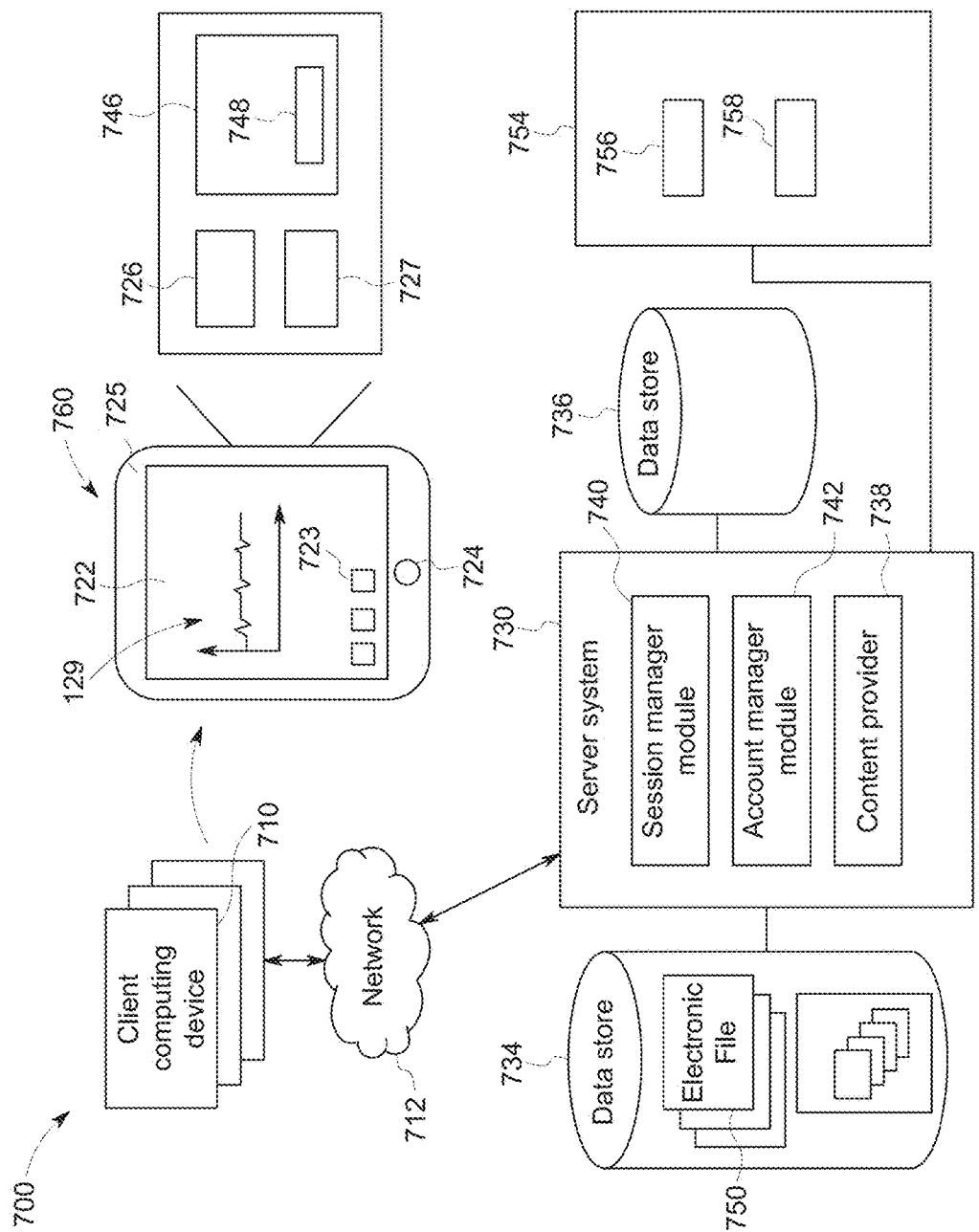
FIG. 14 illustrates a block diagram of an exemplary system in accordance with an embodiment.

FIG. 13 shows a flow chart of the method 600 for generating a work schedule (or plan) to extract a resource fluid from a reservoir using an intelligent sampling process as described above. The method may be used to determine a work schedule to obtain a resource fluid, such as oil, from a subterranean oil field (e.g., a reservoir). The method 600 may represent an algorithm and/or be used to generate a software program that determines a work schedule to extract liquid from a reservoir. In some embodiments, the method 600 may also control computerized systems to pump fluid (e.g., water) and gas (e.g., $CO_2$ or another gas) into the reservoir to extract the resource fluid from the reservoir based on the work schedule determined by the intelligent sampling process. The method may be carried out by one or more processors (e.g., microprocessor or other logic-based device), such as those found in the enumerator 312 or schedule generator 754 (FIG. 14). The method 600 may be directed to a single injection pattern, a combination of injection patterns, or all injection patterns of the reservoir.

At 602, the resource extractions parameters are obtained for the reservoir 302. The resource extraction parameters may be based on, for example, the extraction system being used, the operating conditions, and prior knowledge of the reservoir. The resource extraction parameters include those described above. For example, the resource extraction parameters may include one or more of the following: (a) a symmetric time-period for alternating a first fluid (e.g., water) and a second fluid (e.g., gas, such as $CO_2$); (b) injection rate for the second fluid; (c) maximum value of the first-to-second (first fluid to second fluid) ratio up to which the process is tapered starting from a designated field value; (d) a parameter that specifies the shape or profile for tapering the process; and (e) an operational time period by which the actual first-to-second ratio is changed for the field. In some embodiments, the resource extraction parameters are based on a geological constraint of the reservoir 302. This process may generate a work schedule for the methods and systems disclosed in connection with FIGS. 1-5. For example, this step may include having the WAG enumerator 312 create trial schedules (or ratio functions).

At 604, a first set or group of initial trial schedules may be selected. The initial trial schedules have different values for the resource extraction parameters for alternatingly injecting the liquid and the gas into the reservoir. The initial trial schedules are distributed within a sample space. In other words, the resource extraction parameters may be selected so that the initial trial schedules provide a gross or overall view of the sample space so that modified trial schedules may be selected based on a range of information. The sample space may be infinite. By way of example, the first set may include 4 or 5 trial schedules. The trial schedules may distributed from one extreme to another (e.g. maximum and minimum) in the sampling space.

At 606, initial fluid-extraction data is received. The initial fluid-extraction data is generated by the initial trial schedules being executed (or simulated) by the reservoir model to generate initial fluid-extraction data. The initial fluid-extraction data for a trial schedule may include, for example, an amount of the resource fluid extracted using the respective trial schedule; a flow of the resource fluid; or an amount of working fluid (e.g., $CO_2$) that is produced that can be re-used. In some embodiments, the initial trial schedules are simulated by the reservoir model on-site. In other embodiments, however, the initial trial schedules are prepared at a first location and communicated to a second location (e.g., location of a client enterprise) where the reservoir model is stored. The client enterprise may then execute (e.g., simulate) the initial trial schedules with the reservoir model to generate the initial fluid-extraction data. The initial fluid-extraction data may then be communicated to the first location for generating a surrogate model. Alternatively, the entire method 600 may be performed at the first location or the entire method 600 may be performed at the second location.

At 608, a surrogate model based on the initial fluid-extraction data and the initial trial schedules is generated. For example, the surrogate model may be based on, among other things, the amount of resource fluid extracted using the resource extraction parameters of the corresponding trial schedule; a flow of the resource fluid; or an amount of working fluid that is produced that can be re-used.

The following steps or operations may be repeated until a predetermined condition is satisfied. At 610, a modified trial schedule is selected. The modified trial schedule is based on the initial fluid-extraction data and the initial trial schedules and, if available, prior modified trial schedules and prior modified fluid-extraction data from prior iterations. The modified trial schedule may be selected by evaluating the current surrogate model and selecting the next modified trial schedule based on one or more criteria. For example, at least a plurality of the modified trial schedules may be selected, at least in part, to reduce uncertainty. In addition to uncertainty, one or more of the modified trial schedules may be selected based on improving other metrics or parameters.

The selection of the modified trial schedules may be performed using Bayesian optimization of Gaussian Process Regression surrogates. Alternatively, the selection of the modified trial schedules may be performed using active learning techniques from machine learning as explained above.

At 612, modified fluid-extraction data is received. The modified fluid-extraction data is generated by the modified trial schedules being executed (or simulated) by the reservoir model. The modified fluid extraction data for a trial schedule may include, for example, an amount of the resource fluid extracted using the respective trial schedule; a flow of the resource fluid; or an amount of working fluid that is produced that can be re-used. In some embodiments, the modified trial schedules are simulated by the reservoir model on-site. In other embodiments, however, the modified trial schedules are prepared at a first location and communicated to a second location (e.g., location of a client enterprise) where the reservoir model is stored. The client enterprise may then execute (e.g., simulate) the modified trial schedules with the reservoir model to generate the modified fluid-extraction data. The modified fluid-extraction data may then be communicated to the first location. At 614, the surrogate model is updated with the modified fluid-extraction data and the modified trial schedule from the current iteration.

As described herein, it should be understood, however, that not all modified trial schedules are selected to reduce uncertainty. In some embodiments, one or more of the modified trial schedules may be selected to improve a metric-of-interest in extracting the resource fluid from the reservoir. For example, if a total of ten modified trial schedules have been implemented, the first eight modified trial schedules (1-8) may be selected to reduce uncertainty in the sample space, but the last two trial schedules (9 and 10) may be selected to improve one or more metrics, such as NPV or $CO_2$ utilization. Again, a multi-variable function (e.g., acquisition function) may be used to improve a combination of metrics, which may or may not include reducing uncertainty. In some embodiments, a majority of the modified trial schedules are selected to reduce uncertainty in the sample space as characterized by the surrogate model. In some embodiments, a majority of the modified trial schedules are selected to achieve a better outcome as determined by a multi-variable function (e.g., acquisition function) in which one of the variables is uncertainty.

At step 616, the method may query whether a predetermined condition has been satisfied. If the predetermined condition has not been satisfied, another iteration may be repeated. Various predetermined conditions (or a combination thereof) may be used. The predetermined condition may relate to time or achieving a desired outcome for one or more metrics. For example, the predetermined condition may be satisfied when at least one of: (a) a predetermined time elapses; (b) a metric-of-interest obtained by one of the trial schedules passes a threshold value; (c) respective values of a metric-of-interest that are obtained by the two trial schedules that were last executed are substantially equal; (d) a desired outcome is achieved from a multi-variable function that includes variables for multiple metrics-of-interest; or (e) a total number of trial schedules have been executed or a total number of iterations have been executed.

With respect to (a) above, the predetermined time may be seconds, minutes, hours, or days. For example, the method may be run for a day and the preferred trial schedule at that time (e.g., the trial schedule that achieves the greatest NPV or other metric or the trial schedule that maximizes a cost function based on multiple metrics) may be designated as the work schedule. With respect to (b), the metric of interest may be NPV, $CO_2$ utilization, or oil production. When a threshold value for the metric-of-interest has been passed, the trial schedule at that iteration may be designated as the work schedule. With respect to (c), the respective values provided by different trial schedules may be substantially equal if, for example, the respective values are within a certain percentage of each other (e.g., within 1%, 0.1%, or 0.001%) or are a certain percentage of each other (e.g., the smaller value is 99% or more of the larger value). With respect to (d), the multi-variable function may be an acquisition function, cost function, profit function, or the like. With respect to (e), the total number of trial schedules may be, for example, less than 100, less than 80, less than 60, less than 40, or less than 20. The total number of iterations may be, for example, less than 100, less than 80, less than 60, less than 40, or less than 20.

At 618, the work schedule is generated and may be used by embodiments to extract the resource fluid from the reservoir. The work schedule may be, for example, one or more of the trial schedules (e.g., one of the two last modified trial schedules). Alternatively, the work schedule may be generated by evaluating the current surrogate model to identify a desired schedule. After the work schedule is generated, it should be understood that additional trial schedules may be evaluated.

FIGS. 6-13 generally describe a method in accordance with an embodiment. The method may be, for example, generating a work schedule for extracting a resource fluid from a reservoir (e.g., subterranean reservoir). The work schedule may specify the parameters for providing a working fluid into the reservoir. The working fluid may comprise only a single fluid in some embodiments. In certain embodiments, however, the working fluid includes at least two different fluids that are injected into the reservoir as determined by the schedule. For example, the working fluid may include water and gas. In particular embodiments, the work schedule dictates periodically alternating the injection of $CO_2$ and water into the reservoir according to a work schedule with the intent of sweeping the resource fluid out of the reservoir. The resource fluid may be leftover oil that resides within the reservoir after the oil has been extracted from the reservoir for an extended period of time (e.g., years).

This method illustrated in FIG. 13 and related system determines optimal WAG schedules to extract the liquid from the reservoir by coupling simulation modeling and smart sampling to eliminate computation requirement in comparison to traditional reservoir simulation needs. Analytical capabilities and machine learning are used to help in the integration of reservoir performance to operations and improve workflows for economic optimization and reservoir management. Machine learning and reservoir models are used to optimize operations at the pattern level, field level, or multi-field level. Leveraging such digital technology can allow for automation of the process and remote monitoring of the asset. A platform that uses this technology can enhance collaboration through cross-functional business segments and communication when things change in the field (i.e. well problems or $CO_2$/water supply has been curtailed). Automation and cross collaboration help maintain production optimization by providing faster solutions allowing more informed decisions.

This method and system generated as few samples as necessary to investigate in the numerical simulator by converging on the optima quickly, thereby reducing the number of sample runs investigated. In one example, using the reservoir model or design of experiments, 100 samples were needed to get the optimum outcome. Using this method and system, only 15-20 samples were needed to get the optimum outcome. Merits in saving computation time and efforts give this method and system more space and flexibility in large scale use which is not limited to an injection pattern or $CO_2$ floods. This technique could also be applied to similar applications in the oil and gas industry when evaluating reservoir management and optimization.

FIG. 14 is a block diagram of an exemplary system in accordance with an embodiment. The system 700 includes one or more client computing devices 710 that are capable of communicating over a network 712 with a server system 730. The server system 730 may include one or more web servers and, optionally, one or more application servers. The server system 730 may host a web application and have the tools, application program interfaces (APIs), and scripts, among other things, that may be used for the web application. In some embodiments, a web application includes a web site or web page that allows a user to view waveform data. The server system 730 may be only a single server or include a plurality of different servers that communicate with one another and the client computing devices 710 over the network 712. The server system 730, in some embodiments, is configured to receive and interpret requests through the network 712 from the client computing devices 710 or, more specifically, from software applications 746 of the client computing devices 710. The server system 730 is also configured to respond to the requests and transmit data to the client computing devices 710 in a predetermined format (e.g., HTML format). In some cases, the server system 730 and the client computing devices 710 may form a cloud-type computing system (e.g., public cloud, private cloud, or hybrid cloud).

The network 712 represents any one or combination of multiple different types of networks, such as cable networks, the Internet, private intranets, local area networks, wide area networks, wireless networks, and the like. In particular embodiments, the network 712 is the network of an enterprise (e.g., business) that allows access to authorized users for communicating confidential information for receiving work schedules.

The client computing devices 710 may be implemented as any number of types of computing devices. These devices may include, for instance, personal computers (PCs), tablet computers, notebook computers, laptop computers, smart phones, electronic book readers, and so forth. In particular embodiments, the client computing devices 710 may include portable or handheld devices, such as tablet computers, notebook computers, laptop computers, and smart phones (e.g., iPhones).

The client computing devices 710 may also be configured to operate application programs, such as web browsers, mobile applications, or other software programs. The application program may be, for example, a third-party program (e.g., Google Chrome), a third-party mobile application (which may or may not include the same functionalities as a conventional web browser), or an application program configured for the enterprise using the application program. For instance, the application program may be developed using WebView. The communication network may include a private network, public network, or both. Non-limiting examples of web browsers include, such as Microsoft's Internet Explorer, Google Chrome, Mozilla Firefox, Opera, and Apple's Safari. The application programs may also be similar to mobile applications (referred to as "apps").

Optionally, the application programs may be configured to work with sub-applications or scripts (e.g., plug-ins or extensions) that are executed from within the application program or in concert with the application program. The sub-application runs or is executed concurrently with the application program. Optionally, the sub-application may be stored within the client computing system and/or the server system.

Application programs may be third-party software that retrieve, present, and communicate information through the network. Application programs are configured to communicate with the server system 730 over the network 712. The application programs may communicate using, for example, a known protocol (e.g., Hypertext Transfer Protocol (HTTP) or HTTP-secure (HTTPS)). More specifically, the application programs may send requests (e.g., HTTP requests) for information to any web-accessible internet address. The application programs may also display the information in accordance with a predetermined format (e.g., HTML format). The sub-applications may be launched from within the application program and, optionally, communicate with the server system 730 to retrieve information that may be displayed to the user through the application program. Embodiments set forth herein may be implemented, at least in part, using an application program, a sub-application associated with the application program, or other software program having computer executable code.

In some embodiments, the server system 730 is configured to present a site (e.g., a website) that is capable of handling requests from one or more users and transmitting, in response, various pages (e.g., web pages) that are rendered at the client computing devices 710. For instance, the site can be any type of site that allows a user to view work schedules, graphs, etc. and, optionally, supports user interaction. In another example, the server system 730 may provide applications or sub-applications for the client computing devices 710 to download, store, and run locally. The server system 730 may additionally or alternatively interact with the client computing devices 710 to provide content in other ways.

As one example, the server system 730 may present an institutional website that allows access to data for a user that is authorized to view the data. The server system 730 may include, among other things, a content provider module 738, a session manager module 740, and an account manager module 742. The modules 738, 740 and 742, as well as other modules or services described herein, may be implemented by one or more processors performing program instructions to perform the operations described herein. The program instructions may be stored in data stores 734 or 736. The server system 730 interacts with one or more memories or data stores 734 and 736 in various manners. One or both of the memories or data stores 734 and 736 may store program instructions to direct one or more processors to carry out the instructions described herein.

The data stores 734, 736 (as well as memory at the client computing devices 710) may also store various information, such as account-specific information about users of the site. The data store 734 may also store one or more catalogs related to items that may be viewed by the user. For example, web content (text, videos, pictures, and other content) may be stored therein. Content may also include electronic files 750 (e.g., work or trial schedules, reservoir data, reservoir extraction parameters, etc.). The data associated with different web content may be transmitted to client computing devices 710 in response to individual client request designating location of such web content. It is recognized that the various content may be stored at locations distributed between various data storage areas, geographic locations, file structures, recommendation services, e-commerce catalogs and the like.

During operation, the session manager module 740 maintains network sessions with one or more client computing devices 710, which may be associated with the same enterprise or multiple different enterprises. The session manager module 740 responds to requests from the client computing devices 710 by providing authenticated and unauthenticated network resources. The session manager module 740 reviews incoming requests and determines whether the incoming requests seek access to authenticated or unauthenticated network resources. Requests for an authenticated network resource involve (e.g., require) privilege authentication before the session manager module 740 responds by granting access to the authenticated network resource. When privilege authentication is warranted/needed, the account manager module 742, returns an account lookup response including a prompt for non-sign-in credentials. The non-sign-in credentials corresponding to a type of content maintained in connection with user accounts. The non-sign-in credentials represent user specific information that is unique to a user and is not used as sign-in credentials for a corresponding network service. Optionally, the account manager module 742 may return an account authentication page including at least one of i) a sign-in credential fields or ii) a create new account option. Based on the user's entries at the account authentication page (as explained herein), the account manager module 742 the presents an account lookup response (e.g., when incorrect sign-in credentials are entered). The account manager module 742 may authorize the user to view the work schedules, reservoir data, and/or other information.

Also shown in FIG. 14, a computer 760 (e.g., tablet computer, but other computers may be used) that includes a user display 722, which may be a touchscreen in some embodiments that is configured to identify and locate a touch from a user's finger or stylus. The user display 722 is framed by a housing 725 of the computer 760. The user display 722 defines an area that may present virtual user-selectable elements 723 that may be selected by the user on the user display 722. Alternatively or in addition to the user-selectable elements 723, a user may select tangible or physical user-selectable elements 724 (e.g., buttons, switches, and the like).

Also shown in FIG. 14, the computer 760 may include one or more processors 726 and computer-readable storage media 727. The computer-readable storage media 727 may store program instructions or computer code for a display application 746. In some embodiments, the computer-readable storage media 727 may store programmed instructions or computer code for a sub-application 748. Optionally, the sub-application 748 may be a plug-in or extension that is executable within or by the display application 746.

The system 700 also includes a schedule generator 754 that is configured to generate work schedule for one or more client enterprises. In some embodiments, the schedule generator 754 may also be referred to as a control system. The schedule generator 754 may include components and features that are similar to the components and features of the enumerator 312. As shown, the schedule generator 754 includes one or more processors 756 (e.g., microprocessors, field programmable gate arrays, application specific integrated circuits, multi-core processors, or other electronic circuitry or logic-based devices that carry out instructions of a computer program by carrying out arithmetic, logical, control, and/or input/output operations specified by the instructions) and a tangible and non-transitory computer readable storage medium 758. The tangible and non-transitory computer readable storage medium 758 may include one or more programmed instructions or may include one or more software modules configured to direct the one or more processors 756. The one or more processors 756 may be configured to execute the programmed instructions and perform one or more of the operations and/or steps of the methods set forth herein (e.g., the method 600).

To illustrate an example, the schedule generator 754 may obtain resource extraction parameters from a client computing device 710. The schedule generator 754 may select a set of initial trial schedules. The initial trial schedules have different values of the resource extraction parameters for providing the working fluid into the reservoir. The initial trial schedules are distributed with respect to one another in a sample space. The schedule generator 754 may communicate the initial trial schedules to the client computing devices 710 (or computer 760). The client computing devices 710 may have a reservoir model stored thereon and an application that runs the initial trial schedules using the reservoir model, thereby generating initial fluid-extraction data. The client computing device 710 communicates the initial fluid-extraction data to the server system 730 and the schedule generator 754. The schedule generator 754 may generate a surrogate model based on the initial fluid-extraction data and the initial trial schedules.

The schedule generator 754 is configured to perform iterations of the following until a predetermined condition is satisfied. The schedule generator 754 selects a modified trial schedule and communicates the modified trial schedule to the client computing device 710. The modified trial schedule is selected based on the initial fluid-extraction data and the initial trial schedules and, if available, prior modified trial schedules and prior modified fluid-extraction data from prior iterations. For at least a plurality of the iterations, the modified trial schedule is selected, at least in part, to reduce uncertainty in the sample space as characterized by the surrogate model. The client computing devices 710 may run the modified trial schedule using the reservoir model stored on the client computing device 710, thereby generating modified fluid-extraction data. The client computing device 710 communicates the modified fluid-extraction data to the server system 730 and the schedule generator 754. The schedule generator 754 receives the modified fluid-extraction data and generates an updated surrogate model that is based on the initial fluid-extraction data, the initial trial schedules, the modified fluid-extraction data, and the modified trial schedule, and, if available, the prior modified trial schedules and the prior modified fluid-extraction data from the prior iterations.

After the predetermined condition is satisfied, the schedule generator 754 may communicate a work schedule to the client computing device 710. The work schedule may be a function of one or more of the modified trial schedules. The work schedule may be a function of the last trial schedule or the second-to-last trial schedule. For example, the work schedule may be a slightly modified version of the last trial schedule or the second-to-last trial schedule. In some embodiments, the work schedule may be the last trial schedule or the second-to-last trial schedule.

Although the above example illustrates certain operations being performed by the client computing device 710 and certain operations being performed by the schedule generator 754, it should be understood that other operations may be performed by the client computing device 710 and the schedule generator 754 or that the client computing device 710 and the schedule generator 754 perform different operations. For example, the schedule generator 754 may perform all of the operations. Alternatively, the client computing devices 710 may perform all of the operations.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. For example, a module or system may include a computer processor, controller, or other logic-based device that performs operations based on instructions stored on a tangible and non-transitory computer readable storage medium, such as a computer memory. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
   a control system including one or more processors that are configured to:
   obtain resource extraction parameters for extracting a resource fluid from a reservoir by providing a working fluid into the reservoir, at least one of the resource extraction parameters being based on a geological constraint of the reservoir;
   select a set of initial trial schedules, the initial trial schedules having different values of the resource extraction parameters for providing the working fluid into the reservoir, the initial trial schedules being distributed with respect to one another in a sample space;

receive initial fluid-extraction data, the initial fluid-extraction data being generated by execution of the initial trial schedules with a designated model of the reservoir; and generate a surrogate model based on the initial fluid-extraction data and the initial trial schedules;

wherein the one or more processors are configured to perform iterations of the following until a predetermined condition is satisfied:

select a modified trial schedule based on the initial fluid-extraction data and the initial trial schedules;

receive modified fluid-extraction data, the modified fluid-extraction data being generated by execution of the modified trial schedule with the designated model of the reservoir; and update the surrogate model with the modified fluid-extraction data and the modified trial schedule;

wherein, for at least a plurality of the iterations, the modified trial schedule is selected, at least in part, to reduce uncertainty in the sample space as characterized by the surrogate model, wherein the control system communicates with at least one pump controller, wherein the at least one pump controller controls the injection of the fluid into the reservoir according to the modified trial schedule.

2. The system of claim 1, wherein the modified trial schedules are selected to reduce uncertainty in the sample space by using active learning techniques from machine learning.

3. The system of claim 1, wherein the modified trial schedules are selected to reduce uncertainty in the sample space by using Bayesian optimization of Gaussian Process Regression surrogates.

4. The system of claim 1, wherein the modified trial schedules are selected to improve one or more metrics-of-interest in extracting the resource fluid from the reservoir.

5. The system of claim 1, wherein the modified trial schedules are selected to increase a net present value of extracting the resource liquid from the reservoir.

6. The system of claim 1, wherein the resource extraction parameters characterize how the working fluid is provided into the reservoir while extracting the resource liquid.

7. The system of claim 1, wherein the predetermined condition is satisfied when at least one of: (a) a predetermined time elapses; (b) a metric-of-interest obtained by one of the trial schedules passes a threshold value; (c) respective values of a metric-of-interest that are obtained by the two trial schedules that were last executed are substantially equal; (d) a result obtained from a multi-variable function that includes variables for multiple metrics-of-interest satisfies a designated threshold; or (e) a total number of trial schedules have been executed or a total number of iterations have been executed.

8. A method comprising:

obtaining resource extraction parameters for extracting a resource fluid from a reservoir by providing a working fluid into the reservoir, at least one of the resource extraction parameters being based on a geological constraint of the reservoir;

selecting a set of initial trial schedules, the initial trial schedules having different values of the resource extraction parameters for providing the working fluid into the reservoir, the initial trial schedules being distributed with respect to one another in a sample space; and receiving initial fluid-extraction data, the initial fluid-extraction data being generated by execution of the initial trial schedules with a designated model of the reservoir; and generating a surrogate model based on the initial fluid-extraction data and the initial trial schedules;

wherein the method further comprises performing a plurality of iterations of the following until a predetermined condition is satisfied:

selecting a modified trial schedule based on the initial fluid-extraction data and the initial trial schedules;

receiving modified fluid-extraction data, the modified fluid-extraction data being generated by execution of the modified trial schedule using the designated model of the reservoir; and update the surrogate model with the modified fluid-extraction data and the modified trial schedule;

wherein, for at least a plurality of the iterations, the modified trial schedule is selected, at least in part, to reduce uncertainty in the sample space as characterized by the surrogate model, wherein at least one pump controller is controlled based at least in part on the modified trial schedule to control the injection of the fluid into the reservoir.

9. The method of claim 8, wherein the modified trial schedules are selected to reduce uncertainty in the sample space by using active learning techniques from machine learning.

10. The method of claim 8, wherein the modified trial schedules are selected to reduce uncertainty in the sample space by using Bayesian optimization of Gaussian Process Regression surrogates.

11. The method of claim 8, wherein the modified trial schedules are selected to improve one or more metrics-of-interest in extracting the resource fluid from the reservoir.

12. The method of claim 8, wherein the modified trial schedules are selected to increase a net present value of extracting the resource liquid from the reservoir.

13. The method of claim 8, wherein the resource extraction parameters characterize how the working fluid is provided into the reservoir while extracting the resource liquid.

14. The method of claim 8, wherein the predetermined condition is satisfied when at least one of: (a) a predetermined time elapses; (b) a metric-of-interest obtained by one of the trial schedules passes a threshold value; (c) respective values of a metric-of-interest that are obtained by the two trial schedules that were last executed are substantially equal; (d) a result obtained from a multi-variable function that includes variables for multiple metrics-of-interest satisfies a designated threshold; or (e) a total number of trial schedules have been executed or a total number of iterations have been executed.

15. The method of claim 8, further comprising extracting liquid from the reservoir based on the last trial schedule that was executed when the predetermined condition was met or the trial schedule that was executed immediately before the last trial schedule.

16. The method of claim 15, wherein extracting the resource liquid from the reservoir includes using one of: (a) a water-alternating-gas process; (b) a fracking process; or (c) a steam process.

17. A tangible and non-transitory computer readable medium comprising one or more programmed instructions configured to direct one or more processors to:

obtain resource extraction parameters for extracting a resource fluid from a reservoir by providing a working fluid into the reservoir, at least one of the resource extraction parameters being based on a geological constraint of the reservoir;

select a set of initial trial schedules, the initial trial schedules having different values of the resource extraction parameters for providing the working fluid into the reservoir, the initial trial schedules being distributed with respect to one another in a sample space; and receive initial fluid-extraction data, the initial fluid-extraction data being generated by execution of the initial trial schedules with a designated model of the reservoir; and generate a surrogate model based on the initial fluid-extraction data and the initial trial schedules;

wherein the programmed instructions are configured to direct the one or more processors to perform a plurality of iterations of the following until a predetermined condition is satisfied:

select a modified trial schedule based on the initial fluid-extraction data and the initial trial schedules;

receive modified fluid-extraction data, the modified fluid-extraction data being generated by execution of the modified trial schedule with the designated model of the reservoir; and update the surrogate model with the modified fluid-extraction data and the modified trial schedule;

wherein, for at least a plurality of the iterations, the modified trial schedule is selected, at least in part, to reduce uncertainty in the sample space as characterized by the surrogate model, wherein at least one pump controller is controlled based at least in part on the modified trial schedule to control the injection of the fluid into the reservoir.

18. The tangible and non-transitory computer readable medium of claim 17, wherein the modified trial schedules are selected to reduce uncertainty in the sample space by using active learning techniques from machine learning.

19. The tangible and non-transitory computer readable medium of claim 17, wherein the modified trial schedules are selected to reduce uncertainty in the sample space by using Bayesian optimization of Gaussian Process Regression surrogates.

20. The tangible and non-transitory computer readable medium of claim 17, wherein the modified trial schedules are selected to improve one or more metrics-of-interest in extracting the resource fluid from the reservoir.

* * * * *